US012701415B2

(12) United States Patent
Rajadurai et al.

(10) Patent No.: US 12,701,415 B2
(45) Date of Patent: Aug. 4, 2026

(54) METHOD AND APPARATUS FOR AUTHENTICATION METHOD SELECTION IN EDGE NETWORK SYSTEM

(71) Applicant: Samsung Electronics Co., Ltd., Suwon-si (KR)

(72) Inventors: Rajavelsamy Rajadurai, Bangalore (IN); Nivedya Parambath Sasi, Bangalore (IN); Rohini Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 18/832,390

(22) PCT Filed: Jan. 25, 2023

(86) PCT No.: PCT/KR2023/001124
§ 371 (c)(1),
(2) Date: Jul. 23, 2024

(87) PCT Pub. No.: WO2023/146265
PCT Pub. Date: Aug. 3, 2023

(65) Prior Publication Data
US 2025/0106626 A1 Mar. 27, 2025

(30) Foreign Application Priority Data

Jan. 25, 2022 (IN) .............................. 202241004299
Jan. 13, 2023 (IN) ............................ 2022 41004299

(51) Int. Cl.
*H04L 29/06* (2006.01)
*H04W 12/06* (2021.01)
*H04W 60/00* (2009.01)

(52) U.S. Cl.
CPC ........... *H04W 12/06* (2013.01); *H04W 60/00* (2013.01)

(58) Field of Classification Search
None
See application file for complete search history.

(56) References Cited

U.S. PATENT DOCUMENTS 10,230,684 B2 * 3/2019 Zheng ..................... H04L 61/45
10,448,352 B1 * 10/2019 Grayson ............... H04W 60/00
(Continued)

FOREIGN PATENT DOCUMENTS

CN 113938910 A 1/2022
KR 10-2020-0130141 A 11/2020
(Continued)

OTHER PUBLICATIONS

Kumar, Pardeep; Liyanage, Madhusanka. Efficient and Anonymous Mutual Authentication Protocol in Multi-Access Edge Computing (MEC) Environments. pp. 119-131. https://ieeexplore.ieee.org/xpl/ebooks/bookPdfWithBanner.jsp?fileName=9116709.pdf&bkn=9116617&pdfType=chapter (Year: 2020).*
(Continued)

*Primary Examiner* — Jeremiah L Avery
(74) *Attorney, Agent, or Firm* — Jefferson IP Law, LLP

(57) ABSTRACT

The disclosure relates to a 5G or 6G communication system for supporting a higher data transmission rate. Embodiments herein disclose a method and system for authentication method selection in an edge network system. The method includes determining whether the UE is configured with authentication methods supported by at least one of an ECS, an EES, a home network and a serving network in the edge network system. The method further includes selecting the authentication methods configured at the UE based on a capability of the UE to establish a connection with the EES
(Continued)

```
                                          ┌─200
┌────────────────────────────────────────┐
│ DETERMINES WHETHER THE UE IS CONFIGURED WITH AT │
│ LEAST ONE AUTHENTICATION METHOD FROM A PLURALITY │
│   OF AUTHENTICATION METHODS SUPPORTED BY AT     │──201
│   LEAST ONE OF AN EDGE CONFIGURATION SERVER,    │
│  AN EDGE ENABLED SERVER, A HOME NETWORK AND A   │
│  SERVING NETWORK IN THE EDGE NETWORK SYSTEM     │
└────────────────────────────────────────┘
                    │
                    ▼
┌────────────────────────────────────────┐
│ SELECTS THE AT LEAST ONE AUTHENTICATION METHOD │
│    FROM A PLURALITY OF AUTHENTICATION METHODS  │
│ CONFIGURED AT THE UE BASED ON A CAPABILITY OF THE │
│ UE TO ESTABLISH A CONNECTION WITH THE EDGE ENABLED │──202
│   SERVER BASED ON THE AT LEAST ONE SELECTED    │
│  AUTHENTICATION METHOD WHEN THE UE IS CONFIGURED │
│ WITH THE AT LEAST ONE AUTHENTICATION METHOD FROM │
│      THE PLURALITY OF AUTHENTICATION METHODS    │
└────────────────────────────────────────┘
                    │
                    ▼
┌────────────────────────────────────────┐
│  SENDS THE AT LEAST ONE AUTHENTICATION METHOD  │
│   FROM THE PLURALITY OF AUTHENTICATION METHODS │
│ SUPPORTED BY THE UE TO THE EDGE CONFIGURATION   │
│    SERVER FOR SELECTING THE AT LEAST ONE        │
│    AUTHENTICATION METHOD FROM THE PLURALITY OF  │
│ AUTHENTICATION METHODS TO ESTABLISH A CONNECTION │──203
│  WITH THE EDGE ENABLED SERVER BASED ON THE AT   │
│ LEAST ONE SELECTED AUTHENTICATION METHOD WHEN   │
│   THE UE IS NOT CONFIGURED WITH THE AT LEAST    │
│  ONE AUTHENTICATION METHOD FROM THE PLURALITY   │
│        OF AUTHENTICATION METHODS                │
└────────────────────────────────────────┘
``` based on the at least one selected authentication method when the UE is configured with the authentication methods supported by at least one of the ECS, the EES, the home network and the serving network.

10 Claims, 13 Drawing Sheets

(56) References Cited

U.S. PATENT DOCUMENTS

| 10,511,573 | B2 * | 12/2019 | Larson | H04L 63/10 |
|---|---|---|---|---|
| 11,157,631 | B1 * | 10/2021 | Whelton | H04L 9/0861 |
| 11,184,356 | B1 * | 11/2021 | Tandon | H04L 67/141 |
| 11,196,680 | B1 * | 12/2021 | Caceres | H04L 47/70 |
| 11,337,065 | B1 * | 5/2022 | Balmakhtar | H04W 12/069 |
| 11,595,402 | B2 * | 2/2023 | Bartfai-Walcott | |
| | | | | H04L 65/1036 |
| 2019/0026450 | A1 * | 1/2019 | Egner | G06F 21/44 |
| 2019/0052659 | A1 * | 2/2019 | Weingarten | H04L 63/104 |
| 2019/0274086 | A1 * | 9/2019 | Cui | H04W 40/28 |
| 2020/0084202 | A1 * | 3/2020 | Smith | H04W 12/08 |
| 2020/0167786 | A1 * | 5/2020 | Kursun | H04L 63/08 |
| 2020/0359218 | A1 | 11/2020 | Lee et al. | |
| 2021/0021609 | A1 * | 1/2021 | Smith | H04L 45/72 |
| 2021/0110310 | A1 * | 4/2021 | Guim | G06F 16/27 |
| 2021/0185752 | A1 * | 6/2021 | Samuel | H04L 63/0272 |
| 2021/0282012 | A1 | 9/2021 | Lee et al. | |
| 2021/0368324 | A1 * | 11/2021 | Park | H04W 8/06 |
| 2022/0014566 | A1 * | 1/2022 | Guim Bernat | H04L 63/205 |
| 2022/0038902 | A1 * | 2/2022 | Mueck | H04L 63/1433 |
| 2022/0038937 | A1 * | 2/2022 | Tseng | H04L 69/08 |
| 2022/0086218 | A1 * | 3/2022 | Sabella | H04M 15/66 |
| 2022/0141134 | A1 * | 5/2022 | Lin | H04L 45/745 |
| | | | | 370/328 |
| 2022/0174485 | A1 * | 6/2022 | Abhigyan | H04W 12/06 |
| 2022/0174486 | A1 * | 6/2022 | Abhigyan | H04W 4/50 |
| 2022/0255916 | A1 * | 8/2022 | Smith | H04L 9/3247 |
| 2023/0171618 | A1 | 6/2023 | Ge et al. | |
| 2023/0209337 | A1 * | 6/2023 | Guo | H04W 60/04 |
| | | | | 455/410 |

FOREIGN PATENT DOCUMENTS

| WO | 2021/060937 | A1 | 4/2021 |
|---|---|---|---|
| WO | 2021/167417 | A1 | 8/2021 |

OTHER PUBLICATIONS

Hsu, Chien-Lung et al. A Privacy-Preserved E2E Authenticated Key Exchange Protocol for Multi-Server Architecture in Edge Computing Networks. IEEE Access, vol. 8. https://ieeexplore.ieee.org/stamp/stamp.jsp?tp=&arnumber=9016184 (Year: 2020).*

Wang, Yaying et al. Performance Analysis of Heterogeneous Mobile Edge Computing Networks with Multi-core Server. 2020 IEEE 20th International Conference on Communication Technology (ICCT). https://ieeexplore.ieee.org/stamp/stamp.jsp?tp=&arnumber=9295920 (Year: 2020).*

Khan, Awais et al. Edgestore: A Single Namespace and Resource-Aware Federation File System for Edge Servers. 2018 IEEE International Conference on Edge Computing (EDGE). https://ieeexplore.ieee.org/stamp/stamp.jsp?tp=&arnumber=8473383 (Year: 2018).*

Hossain, Md Delowar et al. Collaborative Task Offloading for Overloaded Mobile Edge Computing in Small-Cell Networks. 2020 International Conference on Information Networking (ICOIN). https://ieeexplore.ieee.org/stamp/stamp.jsp?tp=&arnumber=9016452 (Year: 2020).*

Kumar, Pardeep; Liyanage, Madhusanka. Efficient and Anonymous Mutual Authentication Protocol in Multi-Access Edge Computing (MEC) Environments. IoT Security: Advances in Authentication. https://ieeexplore.ieee.org/xpl/ebooks/bookPdfWithBanner.jsp?fileName=9116709.pdf&bkn=9116617&pdfType=chapter (Year: 2020).*

3GPP; TSG SA; Study on security aspects of enhancement of support for edge computing in the 5G Core (5GC) (Release 17), 3GPP TR 33.839 V17.0.0, Dec. 22, 2021.

3GPP; TSG CT; Enabling Edge Applications; Application Programming Interface (API) specification; Stage 3;(Release 17), 3GPP TS 29.558 V1.2.0, Dec. 6, 2021.

3GPP; TSG SA; Architecture for enabling Edge Applications; (Release 17)', 3GPP TS 23.558 V17.2.0, Dec. 31, 2021.

International Search Report and written opinion dated Apr. 20, 2023, issued in international application No. PCT/KR2023/001124.

European Search report dated Mar. 10, 2025, issued in European Application No. 23747306.1.

Indian Office Action dated Oct. 7, 2024, issued in Indian Application No. 202241004299.

* cited by examiner

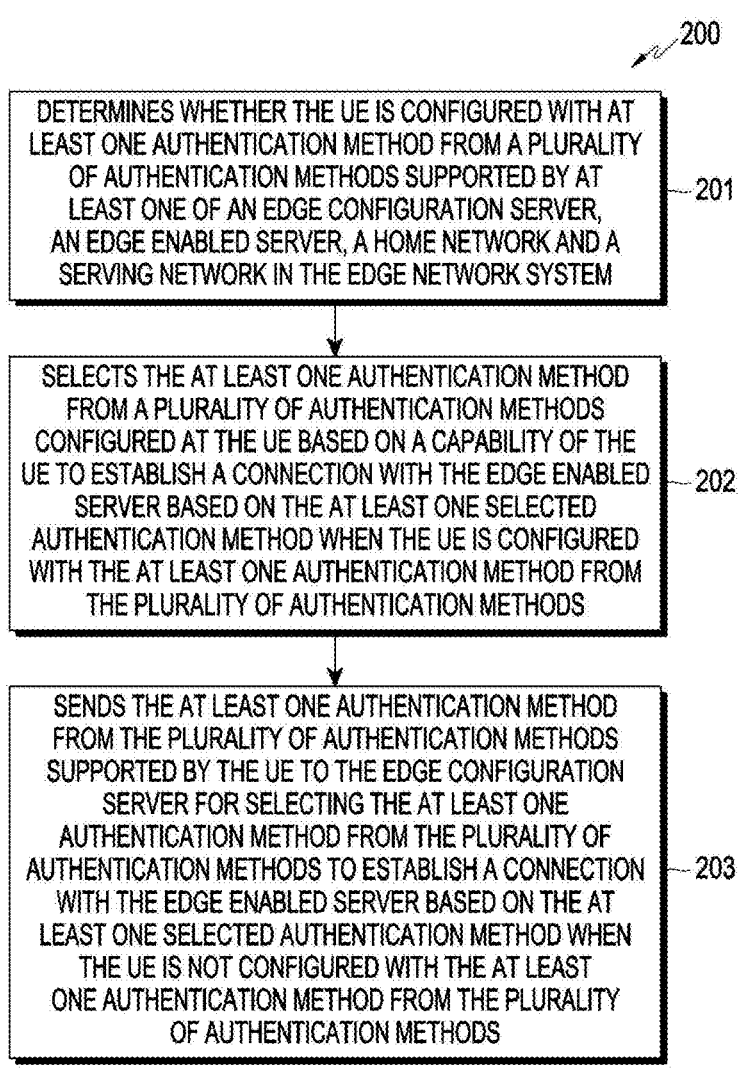

200

DETERMINES WHETHER THE UE IS CONFIGURED WITH AT LEAST ONE AUTHENTICATION METHOD FROM A PLURALITY OF AUTHENTICATION METHODS SUPPORTED BY AT LEAST ONE OF AN EDGE CONFIGURATION SERVER, AN EDGE ENABLED SERVER, A HOME NETWORK AND A SERVING NETWORK IN THE EDGE NETWORK SYSTEM — 201

SELECTS THE AT LEAST ONE AUTHENTICATION METHOD FROM A PLURALITY OF AUTHENTICATION METHODS CONFIGURED AT THE UE BASED ON A CAPABILITY OF THE UE TO ESTABLISH A CONNECTION WITH THE EDGE ENABLED SERVER BASED ON THE AT LEAST ONE SELECTED AUTHENTICATION METHOD WHEN THE UE IS CONFIGURED WITH THE AT LEAST ONE AUTHENTICATION METHOD FROM THE PLURALITY OF AUTHENTICATION METHODS — 202

SENDS THE AT LEAST ONE AUTHENTICATION METHOD FROM THE PLURALITY OF AUTHENTICATION METHODS SUPPORTED BY THE UE TO THE EDGE CONFIGURATION SERVER FOR SELECTING THE AT LEAST ONE AUTHENTICATION METHOD FROM THE PLURALITY OF AUTHENTICATION METHODS TO ESTABLISH A CONNECTION WITH THE EDGE ENABLED SERVER BASED ON THE AT LEAST ONE SELECTED AUTHENTICATION METHOD WHEN THE UE IS NOT CONFIGURED WITH THE AT LEAST ONE AUTHENTICATION METHOD FROM THE PLURALITY OF AUTHENTICATION METHODS — 203

FIG.2

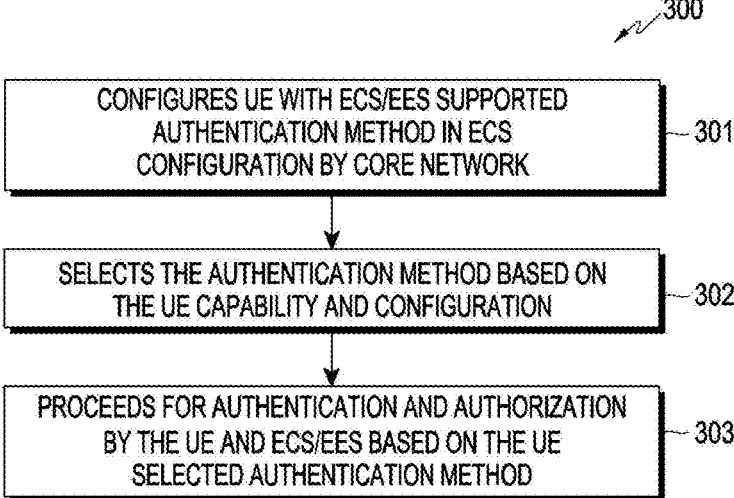

300

CONFIGURES UE WITH ECS/EES SUPPORTED AUTHENTICATION METHOD IN ECS CONFIGURATION BY CORE NETWORK — 301

SELECTS THE AUTHENTICATION METHOD BASED ON THE UE CAPABILITY AND CONFIGURATION — 302

PROCEEDS FOR AUTHENTICATION AND AUTHORIZATION BY THE UE AND ECS/EES BASED ON THE UE SELECTED AUTHENTICATION METHOD — 303

FIG.3

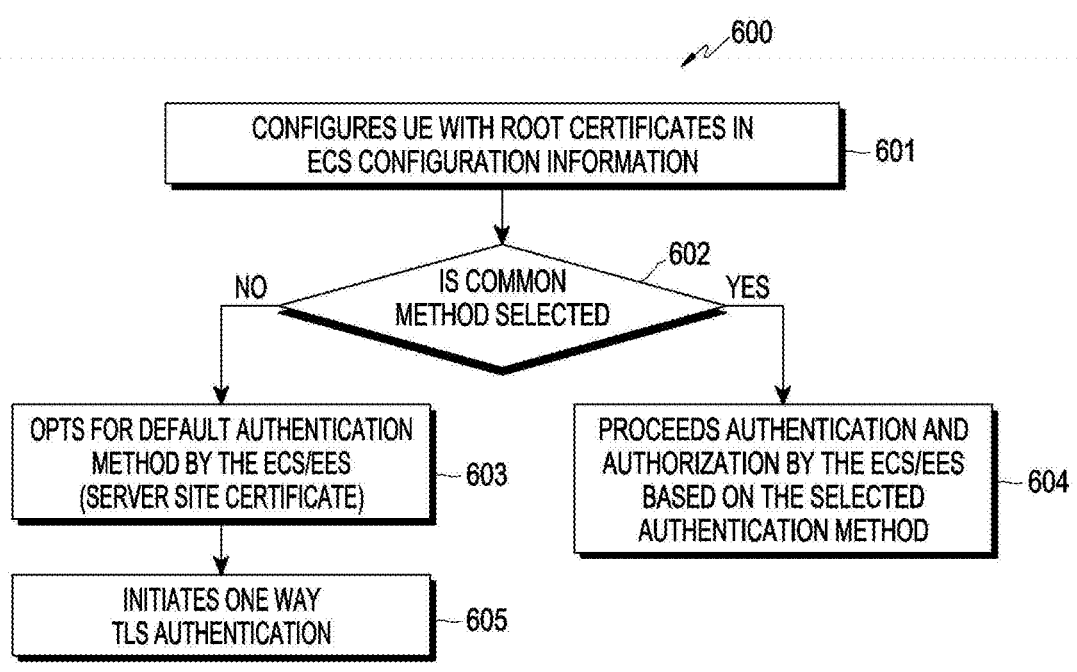

/600

CONFIGURES UE WITH ROOT CERTIFICATES IN
ECS CONFIGURATION INFORMATION — 601

IS COMMON
METHOD SELECTED — 602

NO → OPTS FOR DEFAULT AUTHENTICATION
METHOD BY THE ECS/EES
(SERVER SITE CERTIFICATE) — 603

YES → PROCEEDS AUTHENTICATION AND
AUTHORIZATION BY THE ECS/EES
BASED ON THE SELECTED
AUTHENTICATION METHOD — 604

INITIATES ONE WAY
TLS AUTHENTICATION — 605

UE / EEC

109

ECS

PRE-CONFIGURES THE ECS CONFIGURATION INFO
(ECS ADDRESS, ECS PROVIDER IDENTIFIER, AUTH METHOD) — 701

SELECTION OF AUTH METHOD BASED ON THE
PROVISIONED INFO OR CONFIGURATION — 702

INITIAL PROVISIONING REQUEST (A-KID/B-TID) — 703

AUTHENTICATION USING DEDICATED METHOD — 704

FIG.7

METHOD AND APPARATUS FOR AUTHENTICATION METHOD SELECTION IN EDGE NETWORK SYSTEM

CROSS-REFERENCE TO RELATED APPLICATION(S)

This application is a U.S. National Stage application under 35 U.S.C. § 371 of an International application number PCT/KR2023/001124, filed on Jan. 25, 2023, which is based on and claims priority of an Indian Provisional application No. 202241004299, filed on Jan. 25, 2022, in the Indian Patent Office, and of an Indian Complete patent application No. 202241004299 filed on Jan. 13, 2023, in the Indian Patent Office, the disclosure of each of which is incorporated by reference herein in its entirety.

TECHNICAL FIELD

The present disclosure relates to an edge network system, and more particularly to a method and system for authentication method selection in an edge network system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In general, overall application architecture for enabling edge applications includes plurality of network nodes, such as a 3rd Generation Partnership Project (3GPP) core network, an Edge Enabling Client (EEC) deployed in an User Equipment (UE), Edge Configuration Server (ECS) and Edge Enabling Server (EES). A set of security features that enable the plurality of network nodes to exchange signalling data and user plane data securely. The set of security features includes authentication between the EEC and the ECS/EES, and enables the EEC to be authorized by the ECS/EES. Further some other set of security features includes authentication between the EES and the ECS, and enables the EES to be authorized by the ECS. Thus mutual authentication between the network nodes enables the network nodes to exchange the signalling data and the user plane data securely. Therefore for the mutual authentication, authentication method needs to be supported by each of the network nodes for the mutual authentication between the each of the network nodes.

In existing system, the authentication methods such as a Transport Layer Security (TLS) with an Authentication and Key Management for Applications (AKMA) or the TLS with a Generic Bootstrapping Architecture (GBA) is used for authentication between the network nodes such the EES, the EEC and the ECS. However, the existing system does not disclose anything related to a particular authentication method which is supported for the authentication between the network nodes. Further, the existing system doesn't disclose anything related to a scenario when one of the network nodes is not supporting the authentication method during mutual authentication. Further, the existing systems fail to disclose anything related to a scenario when the network and UE supports multiple authentication methods.

Thus, it is desired to address the above mentioned disadvantages or other shortcomings, or at least provide a useful alternative.

DISCLOSURE OF INVENTION

Solution to Problem

The principal object of the embodiments herein is to provide a method and system for authentication method selection in an edge network system for the mutual authentication between network nodes.

Another object of the embodiments herein is to determine whether a User Equipment (UE) is configured or not with at least one authentication method from a plurality of authentication methods supported by at least one of an edge configuration server (ECS), an edge enabling server (EES), a home network and a serving network in the edge network system.

Another object of the embodiments herein is to select the at least one authentication method from the plurality of authentication methods configured at the UE based on a capability of the UE to establish a connection with the EES based on the at least one selected authentication method.

Another object of the embodiments herein is to send the at least one authentication method from the plurality of authentication methods supported by the UE to the ECS for selecting the at least one authentication method from the plurality of authentication methods to establish a connection with the EES based on the at least one selected authentication method.

Accordingly, the embodiments herein disclose a method for authentication method selection in an edge network system. The method includes determining, by a User Equipment (UE), whether the UE is configured with at least one authentication method from a plurality of authentication methods supported by at least one of an edge configuration server (ECS), an edge enabling server (EES), a home network and a serving network in the edge network system. The method further includes selecting the at least one authentication method from a plurality of authentication methods configured at the UE based on a capability of the UE to establish a connection with the EES based on the at least one selected authentication method when the UE is configured with the at least one authentication method from the plurality of authentication methods supported by at least one of the ECS, the EES, the home network and the serving network. The method further includes sending the at least one authentication method from the plurality of authentication methods supported by the UE to the ECS for selecting the at least one authentication method from the plurality of authentication methods to establish a connection with the EES based on the at least one selected authentication method when the UE is not configured with the at least one authentication method from the plurality of authentication methods supported by at least one of the ECS, the EES, the home network and the serving network.

In an embodiment, the method includes receiving, by the ECS, an EES registration request for registering the EES from the EES; wherein the EES registration request includes at least one of the authentication method from the plurality of authentication methods supported by the EES. The method further includes receiving, by the ECS, the at least one of the authentication method from the plurality of authentication methods supported by the home network and the serving network from an operator. The method further includes filtering, by the ECS, the at least one of the authentication method from the plurality of authentication methods supported by the home network, the serving network, the ECS and the EES. The method further includes configuring, by the ECS, the UE with the filtered at least one authentication method from the plurality of authentication methods through the operator.

In an embodiment, the method includes generating, by the ECS, a configuration information including at least one of an ECS address, an ECS provider identifier, the at least one authentication method from the plurality of authentication methods supported by at least one of the ECS, the EES, the home network and the serving network. The method further includes configuring, by the ECS, the UE with the configuration information through the operator for selecting the at least one authentication method from the plurality of authentication methods.

In an embodiment, the method includes validating, by the ECS, an EES security credential of the EES; wherein the EES registration request includes at least one of the authentication method from the plurality of authentication methods supported by the EES, an EES profile, the EES security credentials. The method further includes storing, by the ECS, a registration information in the EES registration request when the EES security credential is successfully validated. The method further includes indicating, by the ECS, a status of the validation of the EES registration request to the EES. The method further includes identifying, by the ECS, whether the at least one of authentication method from the plurality of authentication methods that is supported by the home network, the serving network, the ECS and the EES in common. The method further includes filtering, by the ECS, the at least one of the authentication method from the plurality of authentication methods when the at least one of authentication method from the plurality of authentication methods that is supported by the home network, the serving network, the ECS and the EES in common is identified.

In an embodiment, the method includes receiving, by the ECS, the EES registration request for registering the EES from the EES; wherein the EES registration request includes at least one of the authentication method from the plurality of authentication methods that is supported by the EES. The method further includes selecting, by the ECS, the at least one authentication method from the plurality of authentication methods that is supported by at least one of the UE, the ECS, the EES, the home network and the serving network.

In an embodiment, the method includes indicating, by the ECS, the selected at least one authentication method from the plurality of authentication methods to the EEC that is UE.

In an embodiment, the method includes determining, by the UE, whether the at least one authentication method from the plurality of authentication methods supported by at least one of the UE, the ECS, the EES, the home network and the serving network. The method further includes selecting, by the UE, the at least one authentication method from the plurality of authentication methods based on a capability of the UE and the configuration when the at least one authentication method from the plurality of authentication methods supported by at least one of, the UE, the ECS, the EES, the home network and the serving network. The method further includes selecting, by the UE, a default authentication method using an operator policy when the at least one authentication method from the plurality of authentication methods that is not supported by at least one of the UE, the ECS, the EES, the home network and the serving network.

In an embodiment, the method includes the selection of the at least one of the authentication method from the plurality of authentication methods by the UE, the home network and the serving network are based on the operator policy.

Accordingly, the embodiments herein disclose the UE for authentication method selection in the edge network system, wherein the UE comprises: a memory; a processor coupled to the memory; and a UE authentication method selector coupled to the memory and the processor, and configured to determine whether the UE is configured with at least one authentication method from the plurality of authentication methods supported by at least one of the ECS, the EES, the home network and the serving network in the edge network system. The processor is configured to select the at least one authentication method from the plurality of authentication methods configured at the UE based on the capability of the UE to establish the connection with the EES based on the at least one selected authentication method when the UE is configured with the at least one authentication method from the plurality of authentication methods supported by at least one of the ECS, the EES, the home network and the serving network. The processor is further configured to send the at least one authentication method from the plurality of authentication methods supported by the UE to the ECS for selecting the at least one authentication method from the plurality of authentication methods to establish the connection with the EES based on the at least one selected authentication method when the UE is not configured with the at least one authentication method from the plurality of authentication methods supported by at least one of the ECS, the EES, the home network and the serving network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 2 is a flow chart illustrating a method for authentication method selection in an edge network system, according to an embodiment as disclosed herein;

FIG. 3 is a flow chart illustrating a method of authentication and authorization by a User Equipment (UE) and an Edge Configuration Server (ECS)/Edge Enabling Server (EES) based on the UE selected authentication method when the UE is configured, according to an embodiment as disclosed herein;

FIG. 6 is a flow chart illustrating the authentication and authorization based on the determined common authentication method, according to an embodiment as disclosed herein;

FIG. 7 is a sequential diagram illustrating Pre-configuration of ECS configuration information by including the supported authentication method in the EEC, according to an embodiment as disclosed herein;

MODE FOR THE INVENTION

Figure 1:
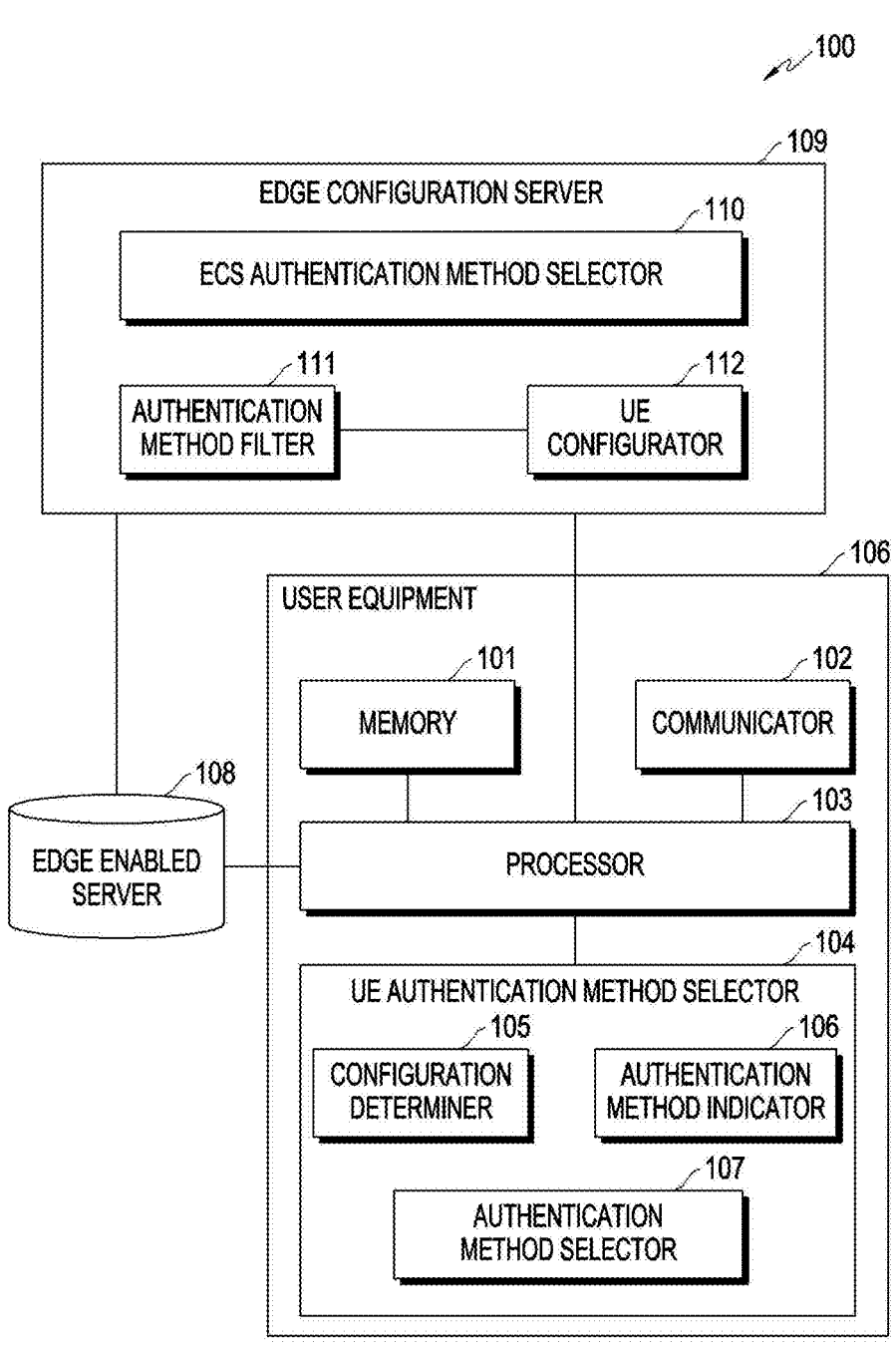
FIG. 1 illustrates an authentication method selection system for authentication method selection in an edge network system, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for authentication method selection in an edge network system. The method includes determining, by a User Equipment (UE), whether the UE is configured with at least one authentication method from a plurality of authentication methods supported by at least one of an Edge Configuration Server (ECS), an edge enabling server (EES), a home network and a serving network in the edge network system. The method further includes selecting the at least one authentication method from a plurality of authentication methods configured at the UE based on a capability of the UE to establish a connection with the EES based on the at least one selected authentication method when the UE is configured with the at least one authentication method from the plurality of authentication methods supported by at least one of the ECS, the EES, the home network and the serving network. The method further includes sending the at least one authentication method from the plurality of authentication methods supported by the UE to the ECS for selecting the at least one authentication method from the plurality of authentication methods to establish a connection with the EES based on the at least one selected authentication method when the UE is not configured with the at least one authentication method from the plurality of authentication methods supported by at least one of the ECS, the EES, the home network and the serving network.

Accordingly, the embodiments herein disclose the UE for authentication method selection in the edge network system, wherein the UE comprises: a memory; a processor coupled to the memory; and a UE authentication method selector coupled to the memory and the processor, and configured to determine whether the UE is configured with at least one authentication method from the plurality of authentication methods supported by at least one of the ECS, the EES, the home network and the serving network in the edge network system. The processor is configured to select the at least one authentication method from the plurality of authentication methods configured at the UE based on the capability of the UE to establish the connection with the EES based on the at least one selected authentication method when the UE is configured with the at least one authentication method from the plurality of authentication methods supported by at least one of the ECS, the EES, the home network and the serving network. The processor is further configured to send the at least one authentication method from the plurality of authentication methods supported by the UE to the ECS for selecting the at least one authentication method from the plurality of authentication methods to establish the connection with the EES based on the at least one selected authentication method when the UE is not configured with the at least one authentication method from the plurality of authentication methods supported by at least one of the ECS, the EES, the home network and the serving network.

Accordingly, the embodiments herein disclose an authentication method selection system for authentication method selection in the edge network system, where the authentication method selection system comprises: the ECS and the UE. The ECS is configured to receive the EES registration request for registering the EES from the EES; wherein the EES registration request includes at least one of the authentication method from the plurality of authentication methods supported by the EES. The ECS is further configured to receive the at least one of the authentication method from the plurality of authentication methods supported by the home network and the serving network from the operator. The ECS is further configured to filter the at least one of the authentication method from the plurality of authentication methods supported by the home network, the serving network, the ECS and the EES. The ECS is further configured to configure the UE with the filtered at least one authentication method from the plurality of authentication methods through the operator. The UE is configured to determine whether the UE is configured with at least one authentication method from the plurality of authentication methods supported by at least one of the ECS, the EES, the home network and the serving network in the edge network system. The UE is further configured to select the at least one authentication method from the plurality of authentication methods configured at the UE based on the capability of the UE to establish the connection with the EES based on the at least one selected authentication method when the UE is configured with the at least one authentication method from the plurality of authentication methods supported by at least one of the ECS, the EES, the home network and the serving network. The UE is further configured to send the at least one authentication method from the plurality of authentication methods supported by the UE to the ECS for selecting the at least one authentication method from the plurality of authentication methods to establish the connection with the EES based on the at least one selected authentication method when the UE is not configured with the at least one authentication method from the plurality of authentication methods supported by at least one of the ECS, the EES, the home network and the serving network.

The conventional approaches for mutual authentication, is optionally use authentication method such as a Transport Layer Security (TLS) with a Authentication and Key Management for Applications (AKMA) as specified in TS 33.535 and TLS with Generic Bootstrapping Architecture (GBA) as specified in TS 33.222 for authentication between EEC and EES and with EEC and ECS, if EEC and ECS supports it.

However the client authentication and key diversity for edge Security is required, as there is optionality in supporting the authentication methods.

Further the conventional approaches fails to address which network/UE side elements need to support which options based on the various deployment scenarios: Even if the mutual authentication can be provided by the TLS with AKMA and TLS with GBA, the conventional approaches is not clear how the options of authentication method are selected at the UE and at the network for a particular service and/or application. In roaming scenarios, if one of the options are not supported at the Serving PLMN, the conventional approaches does not disclose clearly how it is handled. The conventional approaches are not clear which entity maintains the mapping of contexts when the network and the UE supports multiple authentication methods.

In conventional system, it is optional to use TLS with AKMA as specified in TS 33.535 and TLS with GBA as specified in TS 33.220 for authentication between EEC and EES. In order to support mutual authentication, 3GPP SA3 has proposed the following way forward options:

Option 1: When Edge service is provided over 5GS, AKMA is used for generating the shared key between EEC and ECS and TLS-Pre-Shared Key (PSK) protocol is used for mutual authentication Option 2: When Edge service is provided over EPS and/or 5GS, GBA as specified in TS 33.222 is used for generating the shared key between EEC and ECS and TLS-PSK protocol is used for mutual authentication.

Option 3: To use client-server certificate-based TLS authentication for mutual authentication.

Option 4: To use certificate-based TLS server authentication+Client (EEC) side authentication using application layer-based mechanism (such as token) generated by an Emergency Call Service Provider (ECSP) or a third party.

There are various deployment options as follows by considering AKMA and/or GBA supported by the Home Network (HN) or Serving Network (SN):

1. Home network and serving network supports AKMA only
2. Home network supports AKMA and GBA, and serving network (AKMA only)
3. Home network supports AKMA and GBA, and serving network (GBA only)
4. Home network and serving network supports GBA only
5. Home network (GBA) and serving network supports AKMA only
6. Home network (AKMA) and serving network supports GBA only
7. Home network supports AKMA only and serving network supports AKMA and GBA
8. Home network supports GBA only and serving network supports AKMA and GBA However in the conventional system, how to select between options of authentication method, and which network/UE side elements need to support which options is not defined, which will lead to ambiguity in selecting the preferred authentication method, based on network deployment and UE capability.

Unlike conventional system, the proposed system select between authentication options in various deployment scenarios and to optimize which network/UE side elements need to support which authentication method based on: pre-configured ECS configuration information by the ECS, pre-configured ECS configuration information by the MNO and service provisioning the EDN configuration information.

Unlike conventional system, in order to support an authentication method for EDGE service, the proposed system proposes the methods for the EEC to select the authentication method based on a configuration parameter from the core network or pre-configured the Edge configuration information.

Unlike conventional system, the proposed system proposes a method to select the authentication method by a Session Management Function (SMF), based on the capability of the UE and/or the capability of the Home Network and/or capability of the ECS and/or local policy.

Unlike conventional system, the proposed system proposes a method to indicate the supported and/or selected authentication method by the ECS to the 5G network functions using NEF service operations (Nnef_Parameter-Provision Create/Nnef_ParameterProvision_Update/ Nnef_ParameterProvision Delete request/response operations).

Unlike conventional system, the proposed system indicates the supported/selected authentication method to the UE by the EDN and/or by the 5G network functions using the at least one of the following procedure: service provisioning, EES Registration, Edge Application Server (EAS) registration procedure, PDU Session Establishment, PDU Session Modification, PDN Connection Establishment.

Unlike conventional system, the proposed system proposes a method for EES selection by the ECS based on the authentication method supported by the UE and/or the HN in the cases when there are multiple EES available with different security capabilities.

Unlike conventional system, the proposed system proposes a method by considering the capability of home network to indicate its support on the selected options to the UE during roaming.

Unlike conventional system, the proposed system selects the authentication method based on the EEC and/or HN and/or ECS/EES capability. Where Authentication methods supported/selected by the Application Function (ECS/EES) and/or 5G network function (SMF) is indicated as part of ECS configuration information to the UE. The ECS configuration information can be configured at the EEC or provisioned by network through 5GC or Edge service procedure. The UE has the capability to deliver the ECS configuration information to the EEC or to provision the ECS configuration information at the EEC and to explain the system, procedures and configuration required to support the Authentication method selection to the EEC.

Unlike conventional system, in the proposed system based on the ECS configuration information available at the EEC or based on the pre-configuration of ECS selected/ supported authentication method (independent of the ECS configuration information), the EEC determines the authentication method and initiates the authentication method accordingly to perform mutual authentication and establish the TLS to secure the communication.

Unlike conventional system, the proposed system works for a scenario where home network supports an authentication method (for e.g., AKMA) whereas, serving network supports different authentication method (for e.g. GBA) then by default the network and/or the UE selects the TLS server-client certificate based authentication method.

Unlike conventional system, in the proposed system the selection of EES by the ECS can be based on the Authentication method configured and/or provisioned at the ECS.

In an embodiment, the UE determines the Authentication method to be used for mutual authentication with the EDGE server (for example, ECS), based on its security capability and/or HN supported Authentication method and/or SN supported Authentication method and/or Edge server supported Authentication method and/or configured information (HN/AC/User provisioned configuration) and/or received information (Session Management Function (SMF)/ECS provided configuration information).

In an embodiment, a Unified Data Management (UDM) determines the Authentication method to be used for mutual authentication between the UE and the EDGE server (for example, ECS), based on UE security capability and/or HN supported Authentication method and/or SN supported Authentication method and/or Edge server supported Authentication method (received configuration information via NEF from the Edge server).

In an embodiment, the SMF determines the Authentication method to be used for mutual authentication between the UE and the EDGE server (for example, ECS), based on UE security capability and/or HN supported Authentication method and/or SN supported Authentication method and/or Edge server supported Authentication method (received configuration information from UDM) and/or local configuration and/or UE subscription information (received from the UDM) and/or UE location information.

Unlike conventional system, the proposed system proposes the methods for the ECS and participant UEs to negotiate the method of delivery in which both can choose the method based on a configuration parameter from the core network and/or pre-configuration.

In an embodiment, the authentication method being at least one of: client-server certificate-based Transport Layer Security (TLS) authentication, AKMA, GBA, OAuth Access Token and OAuth ID token. The EDGE server being at least one of: ECS, EES and EAS.

Referring now to the drawings and more particularly to FIGS. 1 through 16, where similar reference characters denote corresponding features consistently throughout the figure, these are shown preferred embodiments.

FIG. 1 illustrates an authentication method selection system (100) for authentication method selection in an edge network system, according to an embodiment as disclosed herein.

In an embodiment, the authentication method selection system (100) includes a User Equipment (UE) (106), an Edge Configuration Server (ECS) (109), and an Edge enabling server (EES) (108).

Referring to FIG. 1, examples of the UE (106) include but are not limited to a laptop, a palmtop, a desktop, a mobile phone, a smartphone, Personal Digital Assistant (PDA), a tablet, a wearable device, an Internet of Things (IoT) device, a virtual reality device, a foldable device, a flexible device, an immersive system, etc.

In an embodiment, the UE (106) includes a memory (101), a processor (103), a communicator (or transceiver) (102) and an UE Authentication method selector (104).

The memory (101) stores instructions for authentication method selection to be executed by the processor (103). The memory (101) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (101) may, in some examples, be considered a non-transitory storage medium. The term "non-transitory" may indicate that the storage medium is not embodied in a carrier wave or a propagated signal. However, the term "non-transitory" should not be interpreted that the memory (101) is nonmovable. In some examples, the memory (101) can be configured to store larger amounts of information than its storage space. In certain examples, a non-transitory storage medium may store data that can, over time, change (e.g., in Random Access Memory (101) (RAM) or cache). The memory (101) can be an internal storage unit or it can be an external storage unit of the alarm monitoring device (200), a cloud storage, or any other type of external storage.

The processor (103) is configured to execute instructions stored in the memory (101). The processor (103) may be a general-purpose processor (103), such as a Central Processing Unit (CPU), an Application Processor (AP), or the like, a graphics-only processing unit such as a Graphics Processing Unit (GPU), a Visual Processing Unit (VPU) and the like. The processor (103) may include multiple cores to execute the instructions.

The communicator (or transceiver) (102) is configured for communicating internally between hardware components in the UE (106). Further, the communicator (102) is configured to facilitate the communication between the UE (106) and other devices via one or more networks (e.g. Radio technology). The communicator (102) includes an electronic circuit specific to a standard that enables wired or wireless communication.

The processor (103) (203) is coupled with the UE Authentication method selector (104) to perform the embodiment. The UE Authentication method selector (104) includes a configuration determiner (105), an authentication method indicator (106) and an authentication method selector (107).

The configuration determiner (105) determines whether the UE (106) is configured with at least one authentication method from a plurality of authentication methods supported by at least one of an ECS (109), an EES (108), a home network and a serving network in the edge network system.

The authentication method selector (107) selects the at least one authentication method from the plurality of authentication methods configured at the UE (106) based on a capability of the UE (106) to establish a connection with the EES (108) based on the at least one selected authentication method when the UE (106) is configured with the at least one authentication method from the plurality of authentication methods supported by at least one of the ECS (109), the EES (108), the home network and the serving network The authentication method indicator (106) sends the at least one authentication method from the plurality of authentication methods supported by the UE (106) to the ECS (109) for selecting the at least one authentication method from the plurality of authentication methods to establish a connection with the EES (108) based on the at least one selected authentication method when the UE (106) is not configured with the at least one authentication method from the plurality of authentication methods supported by at least one of the ECS (109), the EES (108), the home network and the serving network.

The ECS (109) includes an ECS authentication method selector (110), an authentication method filter (111) and a UE configurator (112).

The ECS (109) is configured to receive an EES (108) registration request for registering the EES (108) from the EES (108); wherein the EES (108) registration request includes at least one of the authentication method from the plurality of authentication methods supported by the EES (108). The ECS (109) is further configured to receive the at least one of the authentication method from the plurality of authentication methods supported by the home network and the serving network from an operator.

The authentication method filter (111) filters the at least one of the authentication method from the plurality of authentication methods supported by the home network, the serving network, the ECS (109) and the EES (108).

The UE configurator (112) configures the UE (106) with the filtered at least one authentication method from the plurality of authentication methods through the operator.

In an embodiment, the ECS authentication method selector (110) selects the at least one authentication method from the plurality of authentication methods to establish a connection with the EES (108) based on the at least one selected authentication method when the UE (106) is not configured with the at least one authentication method from the plurality of authentication methods supported by at least one of the ECS (109), the EES (108), the home network and the serving network.

FIG. 2 is a flow chart (200) illustrating a method for authentication method selection in the edge network system, according to an embodiment as disclosed herein;

At step 1, the UE (106) determines whether the UE (106) is configured with the at least one authentication method from a plurality of authentication methods supported by at least one of an ECS (109), the EES (108), the home network and the serving network in the edge network system.

At step 2, the UE (106) selects the at least one authentication method from the plurality of authentication methods configured at the UE (106) based on a capability of the UE (106) to establish the connection with the EES (108) based on the at least one selected authentication method when the UE (106) is configured with the at least one authentication method from the plurality of authentication methods supported by at least one of the ECS (109), the EES (108), the home network and the serving network At step 3, the UE (106) sends the at least one authentication method from the plurality of authentication methods supported by the UE (106) to the ECS (109) for selecting the at least one authentication method from the plurality of authentication methods to establish a connection with the EES (108) based on the at least one selected authentication method when the UE (106) is not configured with the at least one authentication method from the plurality of authentication methods supported by at least one of the ECS (109), the EES (108), the home network and the serving network.

FIG. 3 is a flow chart (300) illustrating a method of authentication and authorization by the UE (106) and ECS (109)/EES (108) based on the UE (106) selected authentication method when UE (106) is configured, according to an embodiment as disclosed herein.

At step 301, the core network configures UE (106) with ECS (109)/EES (108) supported authentication method in ECS (109) configuration.

At step 302, the UE (106) selects the authentication method based on the UE (106) capability and configuration.

At step 303, the UE (106) proceeds for authentication and authorization by the UE (106) and ECS (109)/EES (108) based on the UE (106) selected authentication method.

Figure 4:
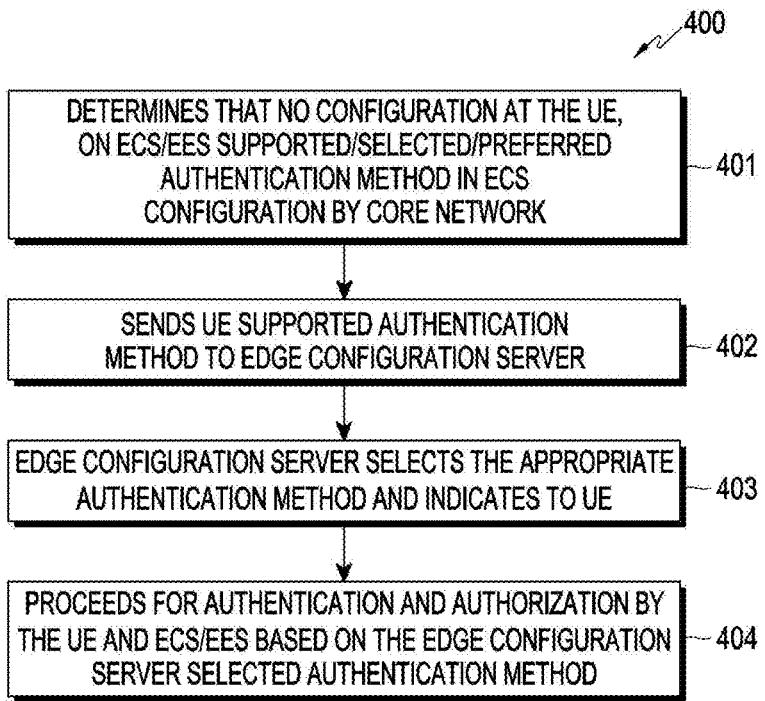
FIG. 4 is a flow chart illustrating a method of authentication and authorization by the UE and ECS/EES based on the ECS selected authentication method when UE is not configured, according to an embodiment as disclosed herein.

FIG. 4 is a flow chart (400) illustrating a method of authentication and authorization by the UE (106) and ECS (109)/EES (108) based on the ECS (109) selected authentication method when UE (106) is not configured, according to an embodiment as disclosed herein.

At step 401, the UE (106) determines that no configuration at the UE (106), on ECS (109)/EES (108) supported/selected/preferred authentication method in ECS (109) configuration by core network.

At step 402, the UE (106) sends UE (106) supported authentication method to ECS (109)

At step 403, the ECS (109) selects the appropriate authentication method and indicates to UE (106).

At step 404, the UE (106) and ECS (109)/EES (108) proceeds for authentication and authorization based on the ECS (109) selected authentication method.

Figure 5:
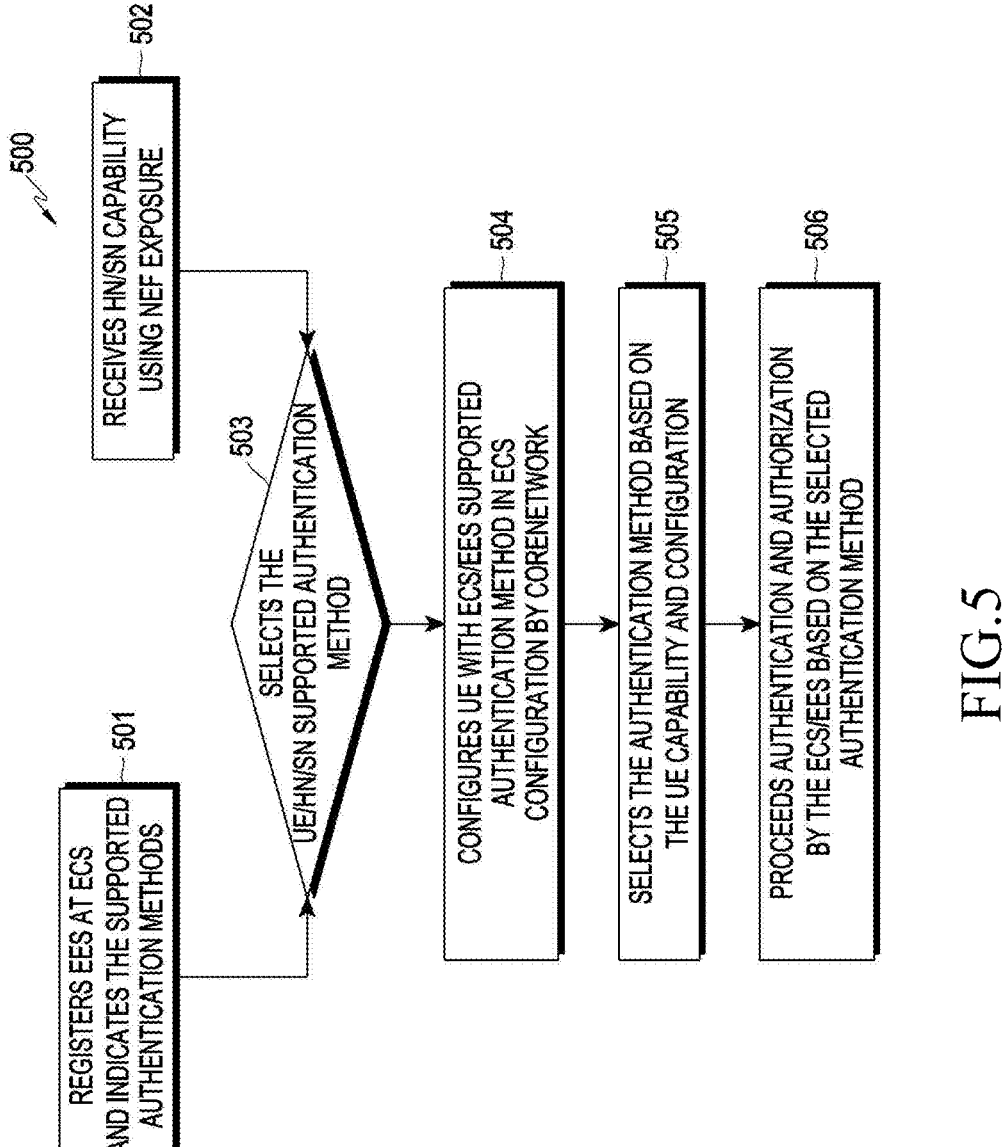
FIG. 5 is a flow chart illustrating configuration of UE for the authentication and authorization, according to an embodiment as disclosed herein.

FIG. 5 is a flow chart (500) illustrating configuration of UE (106) for the authentication and authorization, according to an embodiment as disclosed herein.

At step 501, the EES (108) registers EES (108) at ECS (109) and indicates the supported authentication methods.

At step 502, the ECS (109) Receives HN/SN capability using NEF exposure.

At step 503, the UE (106) selects the UE (106)/HN/SN supported authentication method.

At step 504, the core network configures UE (106) with ECS (109)/EES (108) supported authentication method in ECS (109) configuration.

At step 505, the UE (106) selects the authentication method based on the UE (106) capability and configuration.

At step 506, the UE (106) Proceeds authentication and authorization by the ECS (109)/EES (108) based on the selected authentication method.

FIG. 6 is a flow chart (600) illustrating the authentication and authorization based on the determined common authentication method, according to an embodiment as disclosed herein.

At step 601, configures UE (106) with root certificates in ECS (109) configuration information.

At step 602, the UE (106) determines whether any common authentication method is available.

At step 603, the UE (106) Opts for default authentication method by the ECS (109)/EES (108) (server site certificate)

At step 604, the UE (106) Proceeds authentication and authorization by the ECS (109)/EES (108) based on the selected authentication method At step 605, the UE (106) initiates one way TLS authentication.

In an embodiment, when the UE (106) supports and/or having a capability to a particular authentication method and the Edge Data Network (EDN) servers or the MNO (Serving network and/or Home network) supports different authentication method (which is not supported by the UE (106) in any manner), then the UE (106) and the EDN server/MNO should select a default authentication method which can be supported by all three in order to get the Edge services.

In another embodiment, if the EEC (106), MNO and the ECS (109)/EES (108)/Edge Application Server (EAS) server is having an interoperability issue (i.e., supports different authentication method), then by default the client-server certificate-based TLS authentication is used with Edge Security Service to verify the authenticity and protect edge interfaces.

For e.g., Cases in which, if the UE (106) is having Authentication and Key Management for Applications (AKMA) capability and both the home network and the Edge Data Network (EDN) servers are having the Generic Bootstrapping Architecture (GBA) capability, then there is no way that either the UE (106) can support the GBA or the Mobile network operator (MNO)/EDN server can support AKMA capability. In such scenarios, it is proposed to perform the authentication using client-server certificate-based TLS authentication mechanism and as part of provisioning, EEC is installed with necessary root certificate(s) to validate the EDGE server (for e.g., ECS (109)) certificate.

In an embodiment, the home network determines the default authentication method. The default authentication method may be indicated to the SMF as part of SMF associated parameters by a Unified Data Management (UDM). The Edge server (for e.g., ECS) is pre-configured with the default authentication method by the HN, which the Edge server needs to support. The default authentication method configured in the USIM by the home network (for example, pre-configuration or/and using OTA provisioning and/or UPU procedure) or SMF indicate to the UE (106) as part of NAS message (for example, Protocol Configuration Option).

In an embodiment, the default authentication method can be one of: AKMA, GBA, client-server certificate-based TLS authentication, OAuth Access Token, OAuth ID token and the preferred/selected/supported authentication method can be one of: client-server certificate-based TLS authentication, AKMA, GBA, OAuth Access Token, OAuth ID token.

FIG. 7 is a sequential diagram (700) illustrating Pre-configuration of ECS (109) configuration information by including the supported authentication method in the EEC, according to an embodiment as disclosed herein.

At step 701: The UE (106) is preconfigured with the ECS (109) configuration information. The ECS (109) configuration information includes ECS (109) address, ECS (109) provider identifier, Authentication method selected and/or supported and/or preferred.

In an embodiment the authentication method selected/supported/preferred can be AKMA or GBA or client-server certificate-based, OAuth Access Token, OAuth ID token.

In an embodiment, the ECS (109) configuration information is configured to the EEC by the Application Client or by the user.

At step 702: UE (106) selects the Authentication method (for e.g., AKMA/GBA/client certificate) based on the pre-configured ECS (109) information (i.e. the authentication method supported at the ECS (109)) and its capability (supported Authentication method).

At step 703: UE (106) sends the initial provisioning request to the ECS (109). The initial provisioning request includes relevant parameter (for example, A-KID or B-TID) based on the selected authentication method and other possible parameters.

In an embodiment, if the ECS (109) supports AKMA capability, then the UE (106) initiates an initial provisioning request by including the A-KID to the ECS (109).

In another embodiment, if the ECS (109) supports GBA capability, then the UE (106) initiates an initial provisioning request by including the B-TID to the ECS (109).

At step 704: UE (106) and the ECS (109) perform the authentication using the selected/dedicated method.

TABLE 1

ECS configuration information

| Information element | Status | Description |
|---|---|---|
| ECS address | M | One or more endpoint information (e.g. URI(s), FQDN(s), IP address(es)) of ECS(s) |
| ECS Provider Identifier | O | The identifier of the ECSP that provides the ECS. |
| Authentication Method | M | Consists of at least one of: Supported Authentication method (for illustration purpose, client-server certificate-based, OAuth Access Token, OAuth ID token, AKMA & GBA) Preferred/Selected Authentication method(for illustration purpose, AKMA) Default Authentication method (for |

TABLE 1-continued

ECS configuration information

| Information element | Status | Description |
|---|---|---|
| | | illustration purpose, client-server certificate-based) |

In an embodiment, the Information element Authentication method is mandatory to be included in ECS configuration information.

TABLE 2

ECS configuration information

| Information element | Status | Description |
|---|---|---|
| ECS address | M | One or more endpoint information (e.g. URI(s), FQDN(s), IP address(es)) of ECS(s) |
| ECS Provider Identifier | O | The identifier of the ECSP that provides the ECS. |
| Auth Method | O | Consists of at least one of: Supported Authentication method (for illustration purpose, client-server certificate-based, AKMA & GBA) Preferred/Selected Authentication method(for illustration purpose, AKMA) Default Authentication method (for illustration purpose, client-server certificate-based) |

In an embodiment, the Information element Auth method is optional to be included in ECS configuration information. In such cases if no indication received from ECS (109)/EES (108) regarding the supported authentication method, the UE (106) always selects the configured default authentication method.

Alternative: EES configuration information is configured to the EEC. In this alternative, the EES info is configured at the UE (106). The EES configuration information contains the Authentication method supported/preferred by the EES (108) for the Edge services. In an embodiment, ECS (109) identifies the EES (108) (*s*) based on the EEC provided AC profile(s) information and determines authentication methods supported by the identified EES (108). The supported authentication method is to be provisioned/indicated to the EEC along with other information, e.g. identification of the EDN, EDN service area, EES (108) endpoints. In another embodiment, each EES (108) end points are associated with the supported authentication method in case more than one EES (108) identified.

In another embodiment, ECS (109) has the capability to identify the EES (108) (s) based on the EEC capability and/or EES (108) capability i.e., based on the authentication method supported by EEC and/or EES (108). For example, if EEC capability indicates Authentication method supported as AKMA, then ECS (109) identifies the EES (108) supporting AKMA as authentication method.

Alternative: ECS (109) configuration information is configured to the EEC by the Application client.

In this alternative, the ECS (109) info is configured at the UE (106) by the Application Client (AC). The EES (108) configuration information contains the Authentication method selected/supported/preferred by the ECS (109) for the Edge services. However, method to configure of ECS (109) information by the AC in the UE (106) is not part of this invention.

In an embodiment, before initiating the authentication procedure the EEC fetches the ECS (109) configuration from the Application client and initiate the procedure as per the indication of supported authentication method in the ECS (109) configuration information.

Figure 8:
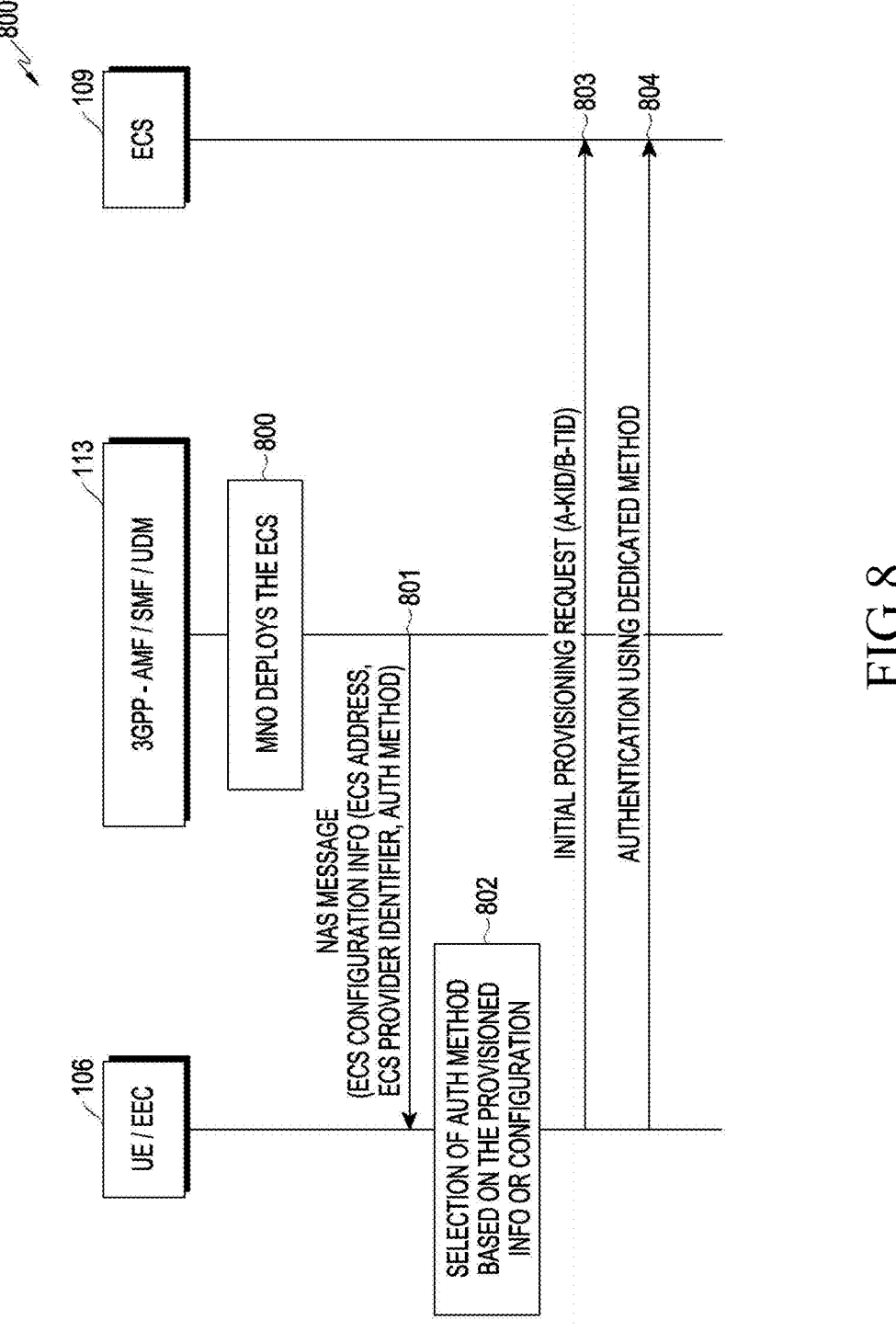
FIG. 8 is a sequential diagram illustrating a Mobile network operator (MNO) configures the ECS configuration info in the UE, according to an embodiment as disclosed herein.

FIG. 8 is a sequential diagram (800) illustrating a MNO configures the ECS (109) configuration info in the UE (106), according to an embodiment as disclosed herein.

In an embodiment, the MNO deploys the ECS (109) and also EES (108) and provides the ECS (109)/EES (108) configuration infoin UE (106)/USIM. As per TR 23.558, The ECS (109) can be deployed in the MNO domain or can be deployed in 3rd party domain by the service provider in which one Edge Enabling Client (EEC) may communicate with one or more ECS (109) concurrently. If the Edge Configuration is deployed by MNO, then the ECS (109) provides one or more EES (108) configuration information. If the ECS (109) is deployed by a non-MNO Edge computing service provider, the ECS (109) endpoint address is pre-configured with the EEC. The EEC that is configured with multiple ECS (109) endpoint address(es), may perform the service provisioning procedure per the ECS (109) of each ECS (109) multiple times.

The UE (106) can contain a single Application Client (AC) or multiple Application Clients, which are served by a single ECS (109). In another scenario, UE (106) has multiple Application Clients where each Application Client can be served by an Edge Application Server, which in turn is served by a different ECS (109) EES (108)

In an embodiment, the ECS (109) configuration information provisioned by MNO through 5GC procedure if the UE (106) has the capability to deliver the ECS (109) configuration information to the EEC on the UE (106).

At step 800: MNO deploys the ECS (109) through 5G procedure. In an embodiment, the MNO provides/provision the ECS configuration information (or at least the supported/ selected authentication method) to the USIM and the ECS (109) fetches the information from the USIM. In another embodiment, the home operator provisions the supported authentication method details (for illustration purpose: SN ID and/or ECS ID and the supported/selected authentication method) of the serving network in the USIM.

Step 801: SMF provides the ECS configuration information in the NAS message to the UE (106). The ECS configuration information includes the ECS address, the Authentication method supported/preferred/selected and other possible parameters.

As per the TS 23.548, the ECS Address Configuration Information consists of one or more FQDN(s) and/or IP address(es) of ECS(s), and of an ECS Provider ID.

In an embodiment, as per the TS 23.502, if the UE (106) supports the ability to receive ECS Address Configuration Information via NAS and to transfer the ECS address(es) to the EEC(s), the UE (106) may receive ECS Address Configuration Information from the SMF via PCO during PDU Session Establishment and/or during PDU Session Modification procedures.

The SMF may receive ECS Address Configuration Information and associated spatial validity conditions from the UDM together with SM subscription information. The UDM in the HPLMN may provide the SMF (in HPLMN in HR case, in VPLMN in LBO case) with ECS address configuration information that depends on the serving PLMN of the UE (106) as defined in clause 6.5.2 of TS23.548.

In another embodiment, the SMF determines the ECS Address Configuration Information to be sent to the UE

18

(106) based on UE subscription information received from UDM as described in clause 4.15.6.3d-2 of TS 23.502.

In another embodiment, the NAS message can be a registration accept message and AMF can provide the ECS address and the supported Authentication method to the UE (106).

In an embodiment, the UE (106) provides the supported authentication to the SMF. The UE (106) provides the supported authentication to the SMF in a NAS message. The NAS message being at least one of: PDU Session Establishment Request, PDU Session Modification Request, PDN Connection Establishment Request. Further the information on the supported authentication for Edge service is included in the PCO in the NAS message from the UE (106).

In an embodiment, If the UE (106) indicated in the PCO that it supports the ability to receive ECS address(es) via NAS, the SMF may provide the ECS Address Configuration Information (which include the details of the authentication method) to the UE (106) in the PCO. The SMF may derive the ECS Information based on local configuration and/or UE subscription information and considering the authentication method supported by the ECS (109) and/or the UE (106) and/or the HN and/or the SN. In non-roaming scenarios, the SMF may also derive the ECS Information based on the UE's location and/or security capability (authentication method supported by the ECS (109) and/or the UE (106) and/or the HN and/or the SN).

In an embodiment, the UDM determines the authentication method based on the received parameters (i.e. ECS Address Configuration Information from the ECS (109)/ EES (108) via NEF) and security capability of the HN/SN/ UE (106) and includes into SMF associated parameters (and/or Subscription data). The UDM may use the AF (ECS/EES) ID received from the NEF to relate the received parameter with a particular subscribed DNN and/or S-NS-SAI. The UDM stores the SMF-Associated parameters including the Authentication method under corresponding Session Management Subscription data type (and/or Subscription data). On receiving the corresponding Session Management Subscription data type (and/or Subscription data) from the UDM, the SMF derive the ECS Information and provides the ECS Address Configuration Information to the UE (106) in the PCO.

At step 802: UE (106) determines the authentication method based on the information received in the NAS message.

In an embodiment, the UE (106) selects the authentication method mentioned in the ECS Address Configuration Information and/or pre-configuration.

In an embodiment, the selection of the authentication method by the UE (106) and/or the SMF and/or the UDM and/or the Edge Server is based on the following order: the one Authentication method supported by the Edge Server and/or the UE (106) and/or the HN and/or the SN.

If more than one Authentication method supported by all, then the authentication method preferred by most of them and/or based on the local policy. When no supported authentication method in common, then default authentication method to be selected.

Step 803: UE (106) sends the initial provisioning request to the ECS (109). The initial provisioning request includes the relevant parameter (for example, A-KID or B-TID or OAuth Token) based on the selected authentication method and other possible parameters.

In an embodiment, if the ECS (109) supports AKMA capability, then the UE (106) initiates an initial provisioning request by including the A-KID to the ECS (109).

In another embodiment, if the ECS (109) supports GBA capability, then the UE (106) initiates an initial provisioning request by including the B-TID to the ECS (109).

At step 804: UE (106) and the ECS (109) performs the authentication using the selected authentication method.

In an embodiment, the ECS Address Configuration Information can be provisioned by the MNO subscription provisioning in UDM as defined in TS 23.548.

In an embodiment, If the ECS (109) deployed by MNO is contracted with one or more ECSP(s), the ECS (109) provides EES configuration information of MNO owned, and ECSP owned EESs via MNO ECS as described in clause 8.3.3.2 in 23.558

Figure 9:
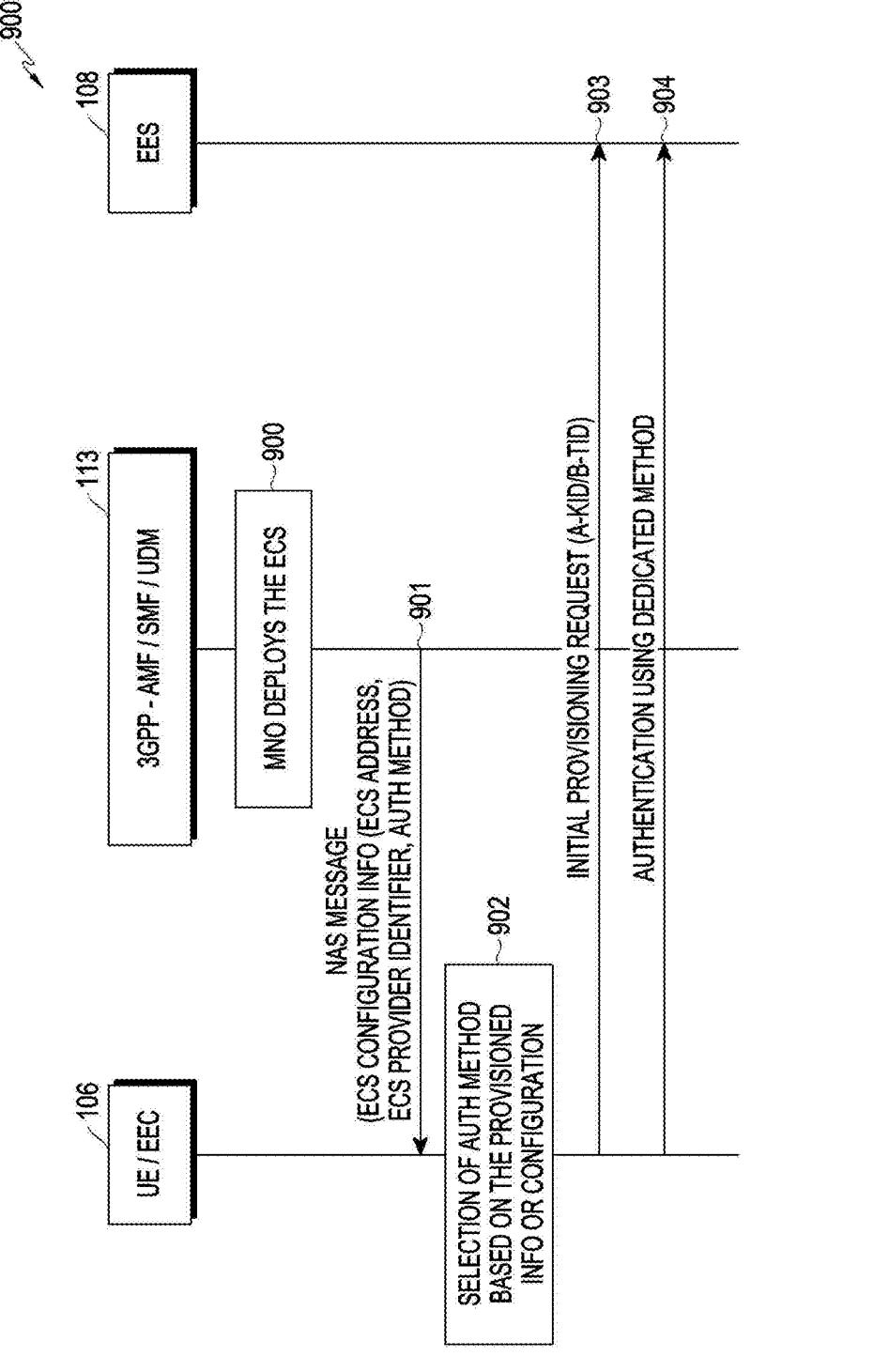
FIG. 9 is a sequential diagram illustrating the MNO configures the EES configuration info in the UE, according to an embodiment as disclosed herein.

FIG. 9 is a sequential diagram (900) illustrating the MNO configures the EES (108) configuration info in the UE (106), according to an embodiment as disclosed herein.

Step 900: MNO deploys the EES (108) through 5G procedure.

Step 901: SMF provides the EES (108) configuration information in the NAS message to the UE (106). The EES (108) configuration information includes the EES ID address, the Authentication method supported/preferred and other possible parameters.

The SMF may receive EES configuration Information and associated spatial validity conditions from the UDM together with SM subscription information. The UDM in the HPLMN may provide the SMF (in HPLMN in HR case, in VPLMN in LBO case) with EES configuration information that depends on the serving PLMN of the UE (106).

In another embodiment, the NAS message can be a registration accept message and AMF can provide the ECS address and the supported Authentication method to the UE (106).

At step 902: UE (106) selects the authentication method based on the information received in the NAS message.

At step 903: UE (106) sends the initial provisioning request to the EES (108). The initial provisioning request includes A-KID/B-TID based on the selected authentication method and other possible parameters.

In an embodiment, if the EES (108) supports AKMA capability, then the UE (106) initiates an initial provisioning request by including the A-KID to the EES (108).

In another embodiment, if the EES (108) supports GBA capability, then the UE (106) initiates an initial provisioning request by including the B-TID to the EES (108).

At step 904: UE (106) and the EES (108) performs the authentication using the dedicated method.

In an embodiment, the UE (106) sends its capability in the PDU session establishment request. The UE (106) capability includes the supported authentication method.

In another embodiment, it is proposed that based on the ID's (e.g. A-KID/B-TID) received, the ECS (109)/EES (108) is capable to infer that if the UE (106) is having AKMA/GBA capability.

In another embodiment, it is proposed that the UE (106) indicates its support on particular authentication method in the UE configuration update complete message as a part of UE configuration update procedure.

Figure 10:
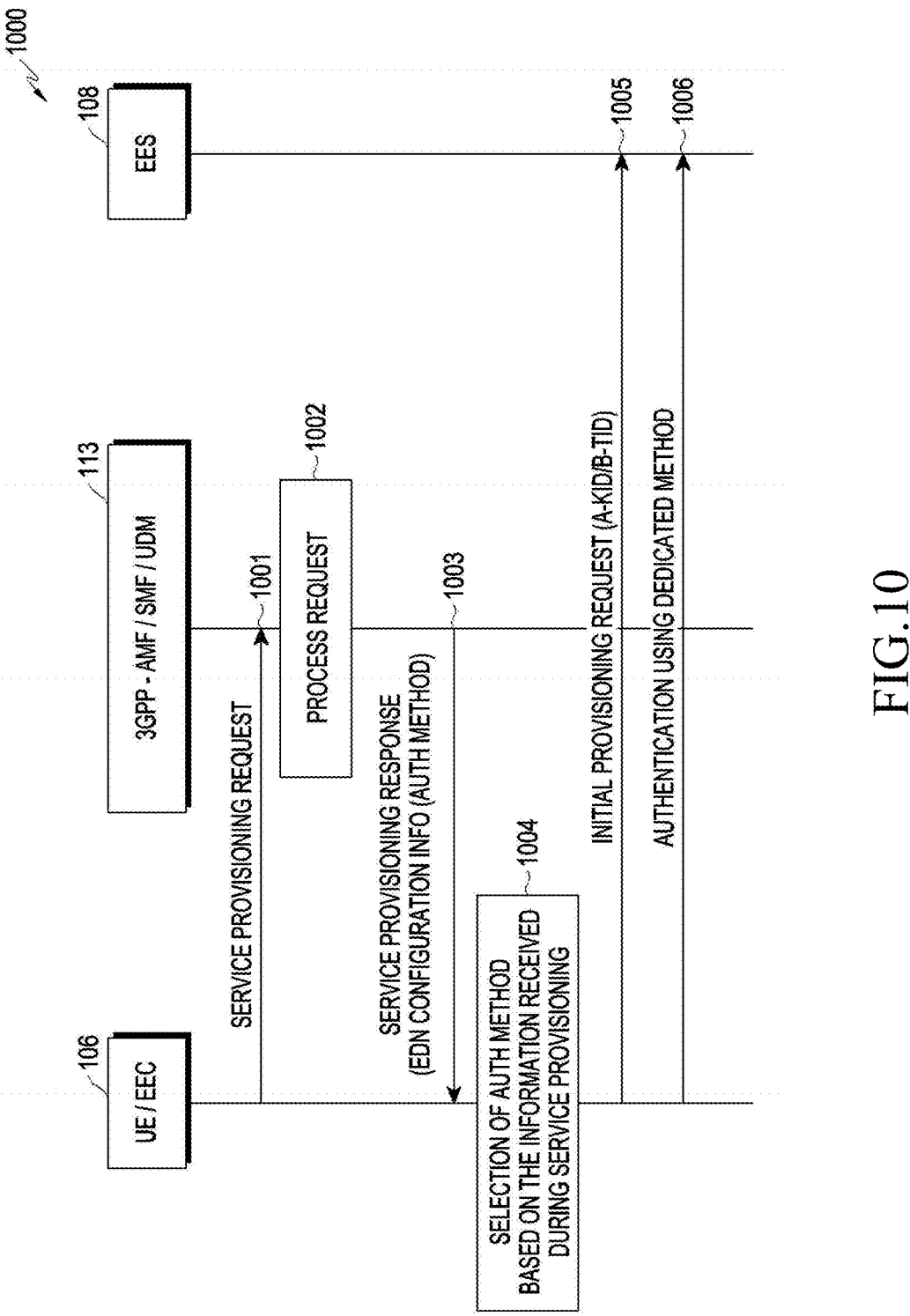
FIG. 10 is a sequential diagram illustrating an Edge Data Network (EDN) configuration info that is provided to the UE during service provisioning, according to an embodiment as disclosed herein.

FIG. 10 is a sequential diagram (1000) illustrating an EDN configuration info that is provided to the UE (106) during service provisioning, according to an embodiment as disclosed herein.

EDN configuration information is configured to the EEC during service provisioning. The ECS is configured with ECSP's policy for service provisioning.

At step 1001: The EEC sends a service provisioning request to the ECS (109). The service provisioning request message includes the security credentials of the EEC received during EEC authorization procedure and may include the UE identifier such as GPSI, connectivity information, UE location and AC profile(s) information, At step 1002: Upon receiving the request, the ECS (109) performs an authorization check to verify whether the EEC has authorization to perform the operation.

At step 1003: If the processing of the request was successful, the ECS (109) responds to the EEC's request with a service provisioning response which includes a list of EDN configuration information, e.g. identification of the EDN, EDN service area, and the required information (e.g. URI, IP address) for establishing a connection to the EES (108) and the authentication method supported/preferred by the ECS (109).

At step 1004: UE (106) selects the authentication method based on the information received in the Service provisioning response from the ECS (109) in order to connect with the EES (108).

At step 1005: UE (106) sends the initial provisioning request to the EES (108). The initial provisioning request includes A-KID/B-TID based on the selected authentication method and other possible parameters.

In an embodiment, if the EES (108) supports AKMA capability, then the UE (106) initiates an initial provisioning request by including the A-KID to the EES (108).

In another embodiment, if the EES (108) supports GBA capability, then the UE (106) initiates an initial provisioning request by including the B-TID to the EES (108).

At step 1006: UE (106) and the EES (108) performs the authentication using the dedicated method.

In another embodiment, the EDN configuration information in the service provisioning notification message includes the Auth method preferred for the EES (108).

EDN Configuration information is shown in the below table 3

TABLE 3

EDN Configuration information

| Information element | Status | Description |
|---|---|---|
| EDN connection information (NOTE 1) | M | Information required by the UE to establish connection with the EDN. |
| >DNN/APN | M | Data Network Name/Access Point Name |
| >S-NSSAI | O | Network Slice information |
| >EDN Topological Service Area | O | The EDN serves UEs that are connected to the Core Network from one of the cells included in this service area. See possible formats in Table 8.2.7-1. |
| List of EESs | M | List of EESs of the EDN. |
| >EESID | M | The identifier of the EES |
| >EES Endpoint | M | The endpoint address (e.g. URI, IP address) of the EES |
| >EASIDs (NOTE 2) | O | List of EASIDs registered with the EES. |
| >EES Provider identifier | O | The identifier of the EES Provider (such as ECSP) |
| >EES Topological Service Area | O | The EES serves UEs that are connected to the Core Network from one of the cells included in this service area. EECs in UEs that are located outside this area shall not be served. See possible formats in Table 8.2.7-1. |

TABLE 3-continued

EDN Configuration information

| Information element | Status | Description |
|---|---|---|
| >EES Geographical Service Area | O | The area being served by the EES in Geographical values (as specified in clause 7.3.3.3) |
| >List of EES DNAI(s) | O | DNAI(s) associated with the EES/EAS. This IE is used as Potential Locations of Applications in clause 5.6.7 of 3GPP TS 23.501 [2]. |
| >EES Service continuity support | O | Indicates if the EES supports service continuity or not. This IE also indicates which ACR scenarios are supported by the EES. |
| >EEC registration configuration | M | Indicates whether the EEC is required to register on the EES to use edge services or not. |
| Lifetime | O | Time duration for which the EDN configuration information is valid and supposed to be cached in the EEC. |
| Auth Method | M/O | Consists of at least one of: Supported Authentication method (for illustration purpose, client-server certificate-based, OAuth Access Token, OAuth ID token, AKMA & GBA) Preferred/Selected Authentication method(for illustration purpose, AKMA) Default Authentication method (for illustration purpose, client-server certificate-based) |

(NOTE 1):
If the UE is provisioned or pre-configured with URSP rules by the HPLMN, the UE handles the precedence between EDN connection info and URSP rules as defined in 3GPP TS 23.503 [12] clause 6.1.2.2.1. EDN connection info is considered to be part of UE Local Configurations.
(NOTE 2):
EAS information is limited to the EEC requested applications. If no AC profiles were present in the service provisioning request, the EAS information is subject to the ECSP policy (e.g. no EAS information or a subset of EAS information related to the EES).

In an embodiment, the Information element Auth method is Optional to be included in ECS configuration information. In such cases, if no indication received from ECS (109)/EES (108) regarding the supported authentication method, the UE (106) always selects the default authentication method supported by EEC and ECS (109)/EES (108).

Figure 11:
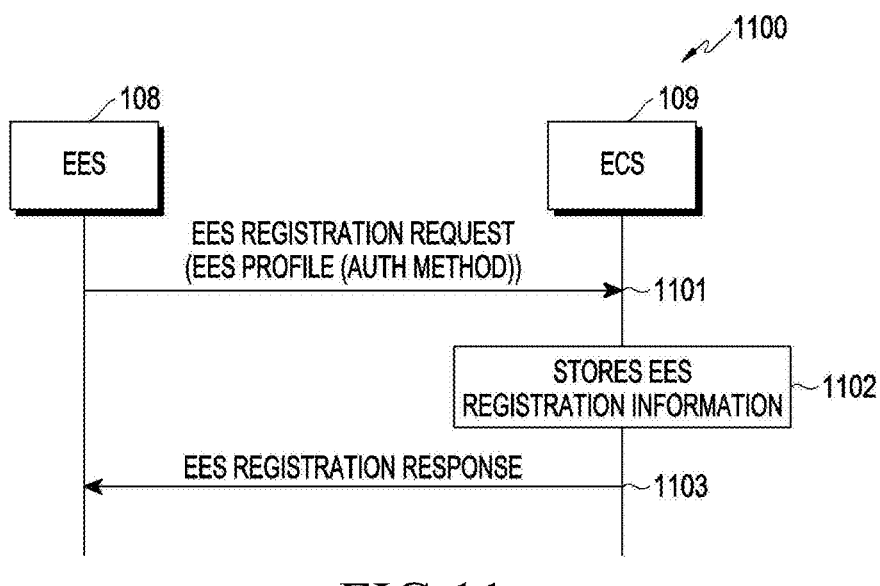
FIG. 11 is a sequential diagram illustrating the authentication method in EES profile during the EES registration, according to an embodiment as disclosed herein.

FIG. 11 is a sequential diagram (1100) illustrating the authentication method in EES profile during the EES registration, according to an embodiment as disclosed herein.

In this embodiment, the EES (108) can indicate the supported/preferred authentication method to the ECS (109) during the registration request. The EES profile includes the supported authentication method information.

EES Profile is shown in below table:

TABLE 4

EES profile

| Information element | Status | Description |
|---|---|---|
| EESID | M | The identifier of the EES |
| EES Endpoint | M | Endpoint information (e.g. URI, FQDN, IP address) used to communicate with the EES. This information is provided to the EEC to connect to the EES. |
| EASIDs | M | List of EASIDs registered with the EES. |
| EEC registration configuration | M | Indicates whether the EEC is required to register on the EES to use edge services or not. |
| EES | O | The identifier of the ECSP that |

TABLE 4-continued

EES profile

| Information element | Status | Description |
|---|---|---|
| Provider Identifier | | provides the EES Provider. |
| EES Topological Service Area | O | The EES serves UEs that are connected to the Core Network from one of the cells included in this service area. EECs in UEs that are located outside this area shall not be served. See possible formats in Table 8.2.7-1. |
| EES Geographical Service Area | O | The area being served by the EES in Geographical values (as specified in clause 7.3.3.3) |
| List of EES DNAI(s) | O | DNAI(s) associated with the EES. This IE is used as Potential Locations of Applications in clause 5.6.7 of 3GPP TS 23.501 [2]. It is a subset of the DNAI(s) associated with the EDN, where the EES resides. |
| EES Service continuity support | O | Indicates if the EES supports service continuity or not. This IE also indicates which ACR scenarios are supported by the EES. |
| Auth Method | M/O | Consists of at least one of: Supported Authentication method (for illustration purpose, client-server certificate-based, OAuth Access Token, OAuth ID token, AKMA & GBA) Preferred/Selected Authentication method(for illustration purpose, AKMA) Default Authentication method (for illustration purpose, client-server certificate-based) |

In an embodiment, the Information element Auth method is optional to be included in ECS configuration information. In such cases, if no indication received from ECS (109)/EES (108) regarding the supported authentication method, the UE (106) always selects the default authentication method supported by EEC and ECS (109)/EES (108).

In this an embodiment, it is proposed that the EES (108) indicates its support for a dedicated authentication method in service capability APIs exposed by the EES (108) to the EAS(s).

At step 1101, the EES (108) may transmit EES registration request to ECS (109). The EES registration request may include EES profile (Auth Method).

At step 1102, the ECS (109) may store EES registration information.

At step 1103, the ECS (109) may transmit EES registration response to the EES (108).

Figure 12:
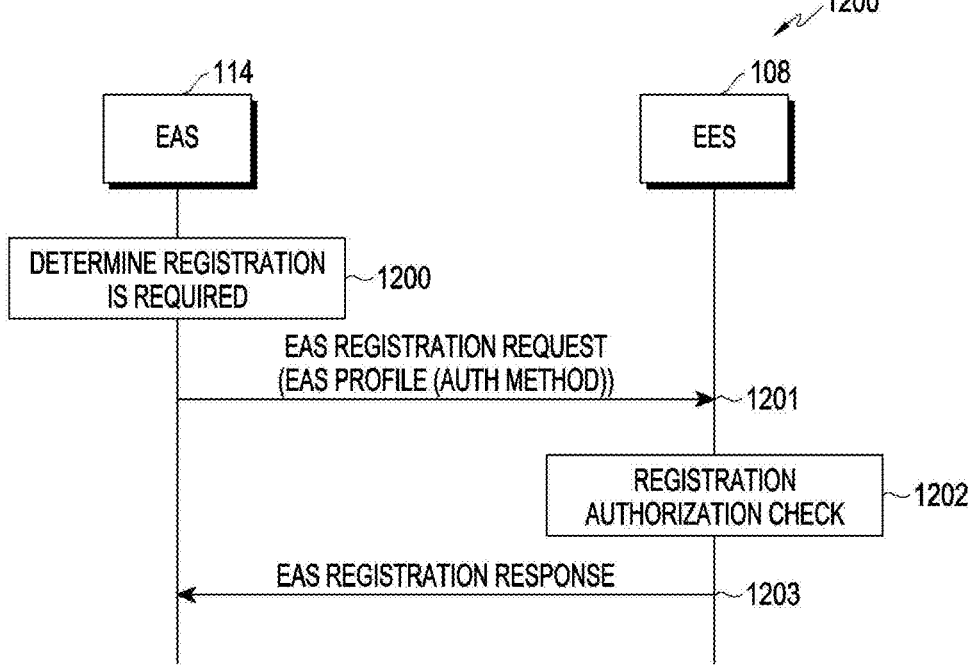
FIG. 12 is a sequential diagram illustrating the authentication method in an Edge Application Server (EAS) profile during the EAS registration, according to an embodiment as disclosed herein.

FIG. 12 is a sequential diagram (1200) illustrating the authentication method in an EAS profile during the EAS registration, according to an embodiment as disclosed herein.

In this embodiment, the EAS (114) can indicate the supported/preferred authentication method to the EES (108) during the registration request. The EAS profile includes the supported authentication method information.

The EAS profile is shown in below table:

TABLE 5

| EAS profile | | |
|---|---|---|
| Information element | Status | Description |
| EASID | M | The identifier of the EAS |
| EAS Endpoint | M | Endpoint information (e.g. URI, FQDN, IP address) used to communicate with the EAS. This information maybe discovered by EEC and exposed to ACs so that ACs can establish contact with the EAS. |
| ACID(s) | O | Identifies the AC(s) that can be served by the EAS |
| EAS Provider Identifier | O | The identifier of the ASP that provides the EAS. |
| EAS Type | O | The category or type of EAS (e.g. V2X) |
| EAS description | O | Human-readable description of the EAS |
| EAS Schedule | O | The availability schedule of the EAS (e.g. time windows) |
| EAS Geographical Service Area | O | The geographical service area that the EAS serves. ACs in UEs that are located outside that area shall not be served. |
| EAS Topological Service Area | O | The EAS serves UEs that are connected to the Core Network from one of the cells included in this service area. ACs in UEs that are located outside this area shall not be served. See possible formats in Table 8.2.7-1. |
| EAS Service KPIs | O | Service characteristics provided by EAS, detailed in Table 8.2.5-1 |
| EAS service permission level | O | Level of service permissions e.g. trial, gold-class supported by the EAS |
| EAS Feature(s) | O | Service features e.g. single vs. multi-player gaming service supported by the EAS |
| EAS Service continuity support | O | Indicates if the EAS supports service continuity or not. This IE also indicates which ACR scenarios are supported by the EAS. |
| List of EAS DNAI(s) | O | DNAI(s) associated with the EAS. This IE is used as Potential Locations of Applications in clause 5.6.7 of 3GPP TS 23.501 [2]. It is a subset of the DNAI(s) associated with the EDN where the EAS resides. |
| List of N6 Traffic Routing requirements | O | The N6 traffic routing information and/or routing profile ID corresponding to each EAS DNAI. |
| EAS Availability Reporting Period | O | The availability reporting period (i.e. heartbeat period) that indicates to the EES how often it needs to check the EAS's availability after a successful registration. |
| EAS Required Service APIs | O | A list of the Service APIs that are required by the EAS |
| EAS Status | O | The status of the EAS (e.g. enabled, disabled, etc.) |
| Auth Method | M/O | Consists of at least one of: Supported Authentication method (for illustration purpose, client-server certificate-based, OAuth Access Token, OAuth ID token, AKMA & GBA) Preferred/Selected Authentication method(for illustration purpose, AKMA) Default Authentication method (for illustration purpose, client-server certificate-based) |

In an embodiment, the Information element Auth method is optional to be included in ECS configuration information. In such cases, if no indication received from ECS (109)/EES (108) regarding the supported authentication method, the UE (106) always selects the default authentication method supported by EEC and ECS (109)/EES (108).

The network capability exposure to EAS(s) depends on the deployment scenarios and the business relationship of the ASP/ECSP with the PLMN operator as described in TS 23.558

In an embodiment, the EAS(s) (acting as trusted or untrusted AF) may directly access the 3GPP Core Network capabilities as specified in 3GPP TS 23.501 and 3GPP TS 23.682. It is proposed that the 3GPP core network capabilities include the dedicated authentication method it supports.

In another embodiment, the EES (108) may re-expose the network capabilities of the 3GPP core network to the EAS(s) as per the CAPIF architecture specified in 3GPP TS 23.222. It is proposed that the 3GPP core network capabilities include the dedicated authentication method it supports.

In an embodiment, the dedicated authentication method can be AKMA or GBA.

In this alternative it is proposed that, if there are multiple EES (108) available at the network and if there is a need for EES (108) selection, then it is possible to select the EES (108) based on its supported authentication capability.

Consider a scenario in which EES-1 supports AKMA and EES-2, EES-3, EES-4 supports GBA. If the home network and the ECS (109) supports AKMA capability, then the ECS (109) always selects the EES-1 which supports AKMA capability for the EDGE services rather than selecting EES-2/EES-3/EES-4.

At step 1200, the EAS (114) may determine that registration is required.

At step 1201, the EAS (114) may transmit EAS registration request to EES (108). The EAS registration request may include EAS profile (Auth Method).

At step 1202, the EES (108) may check registration authorization check.

At step 1203, the EES (108) may transmit EAS registration response to the EAS (114).

Figure 13:
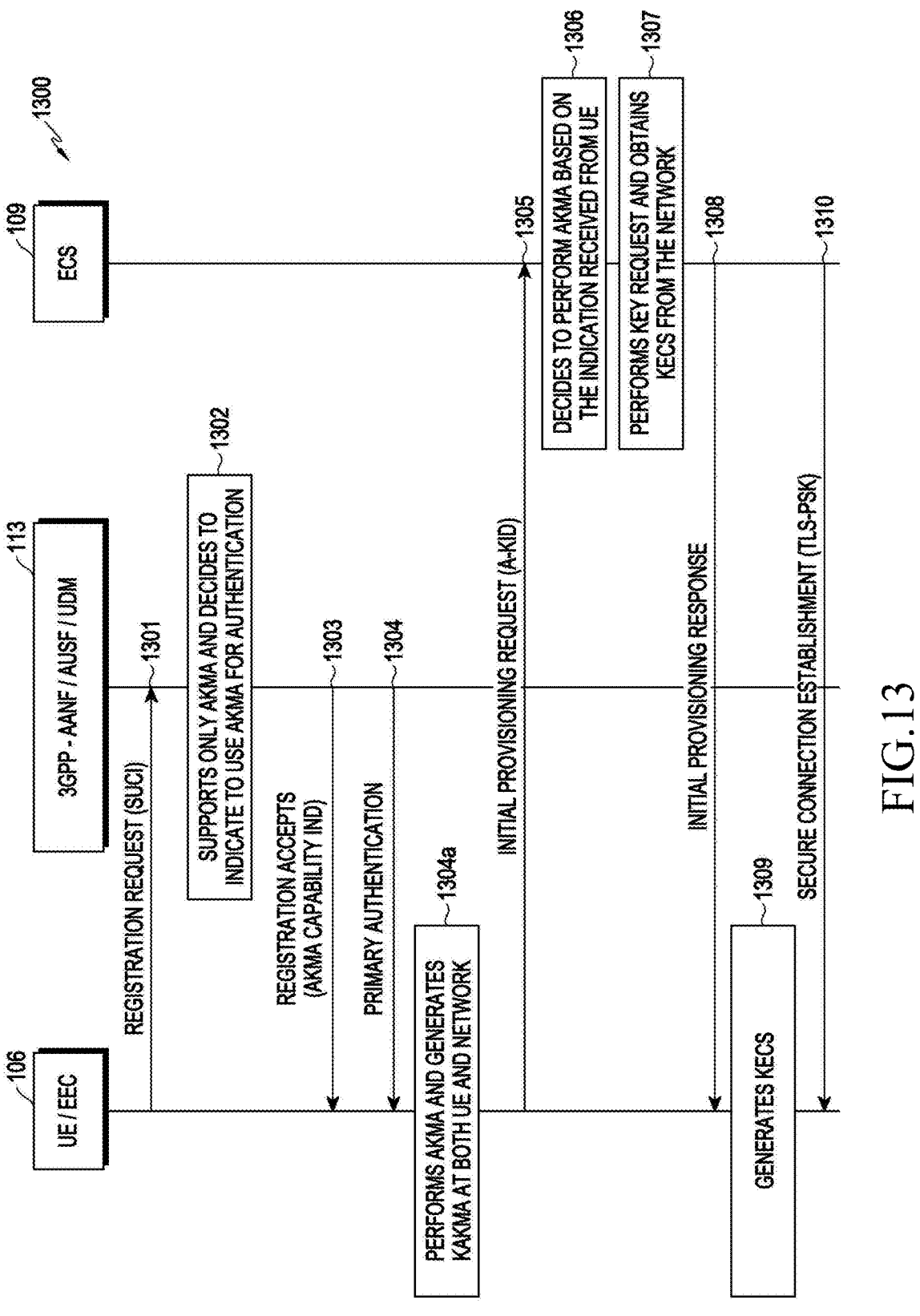
FIG. 13 is a sequential diagram illustrating a method of Authentication and Key Management for Applications (AKMA) optimization in home network in non-roaming case, according to an embodiment as disclosed herein.

FIG. 13 is a sequential diagram (1300) illustrating a method of AKMA optimization in home network in non-roaming case, according to an embodiment as disclosed herein.

Pre-condition: UE (106) supports both AKMA and GBA capability, Network supports only AKMA capability.

At step 1301: UE (106) sends a registration request to the AMF. The registration requests include the SUCI and other possible parameters of the UE (106).

In an embodiment, the UE (106) indicates its capability of supporting both AKMA and GBA to the network in the registration request.

At step 1302: Network supports only AKMA capability. Based on the registration request received, network decides to indicate AKMA capability to the UE (106).

In an embodiment, the AKMA capability indicates the home network support to use AKMA.

In another embodiment, the network requires the AUSF to provide the AKMA capability of ECS(s) to the UE (106), then the UE (106) can determine to use AKMA when establish connection with ECS (109).

At step 1303: AUSF sends the AKMA capability indication to the AMF and the AMF forwards the AKMA capability indication to the UE (106) in the registration accept message.

At step 1304: UE (106) and the network performs the primary authentication procedure. A successful 5G primary authentication results in KAUSF being stored at the AUSF and the UE (106).

AKMA reuses the 5G primary authentication procedure executed e.g. during the UE (106) Registration to authenticate the UE (106).

At step 1304a: If the UE (106) is authorised for AKMA service, then the KAKMA is derived at the AUSF and at the UE (106) as described in clause 6.1 of TS 33.535.

At step 1305: The UE (106) initiates the Initial provisioning procedure with the ECS (109). The initial provisioning request message includes A-KID. ECS is Application Function (AF) for the AAnF as specified in TS 33.535.

In an embodiment the ECS (109) or the 5GC is configured with the edge computing related profile for the EEC.

In another embodiment, the EES (108) can be the Application function.

At step 1306: On receiving the initial provisioning request from the UE (106), the ECS (109) checks the AKMA capability support configured and decides to contact the AAnF for obtaining the KECS.

At step 1307: The ECS (109) contacts the AAnF (using A-KID) to obtain the corresponding key KECS (KAF) of the UE (106), if it does not hold a valid KECS of the UE (106) or the A-KID provided by the UE (106) is different from the previous A-KID. The AAnF provides the derived key (KAF) to the ECS (109) for the Edge Computing service. The KECS is the AKMA Application Key (KAF) and derived as specified in TS 33.535 by both the UE (106) and the ECS (109).

At step 1308 and 1309: The key KECS is used by the ECS (109) to derive the key KECS-Pre-Shared Key (PSK). The derivation of KECS-PSK is not covered in this document. ECS (109) sends the initial provisioning response to the UE (106). The response message includes the AKMA capability of Serving network and other possible parameters.

Up on receiving the response message from the V-EES, the UE (106) derives the AKMA specific Application key (KECS) at the UE (106) side.

At step 1310: UE (106) and ECS (109) establishes the TLS tunnel. Once TLS session is created successfully, the EEC initiates the service provisioning procedure with the ECS (109) (as specified in clause 8.3 in TS 23.558) over the established TLS.

Figure 14:
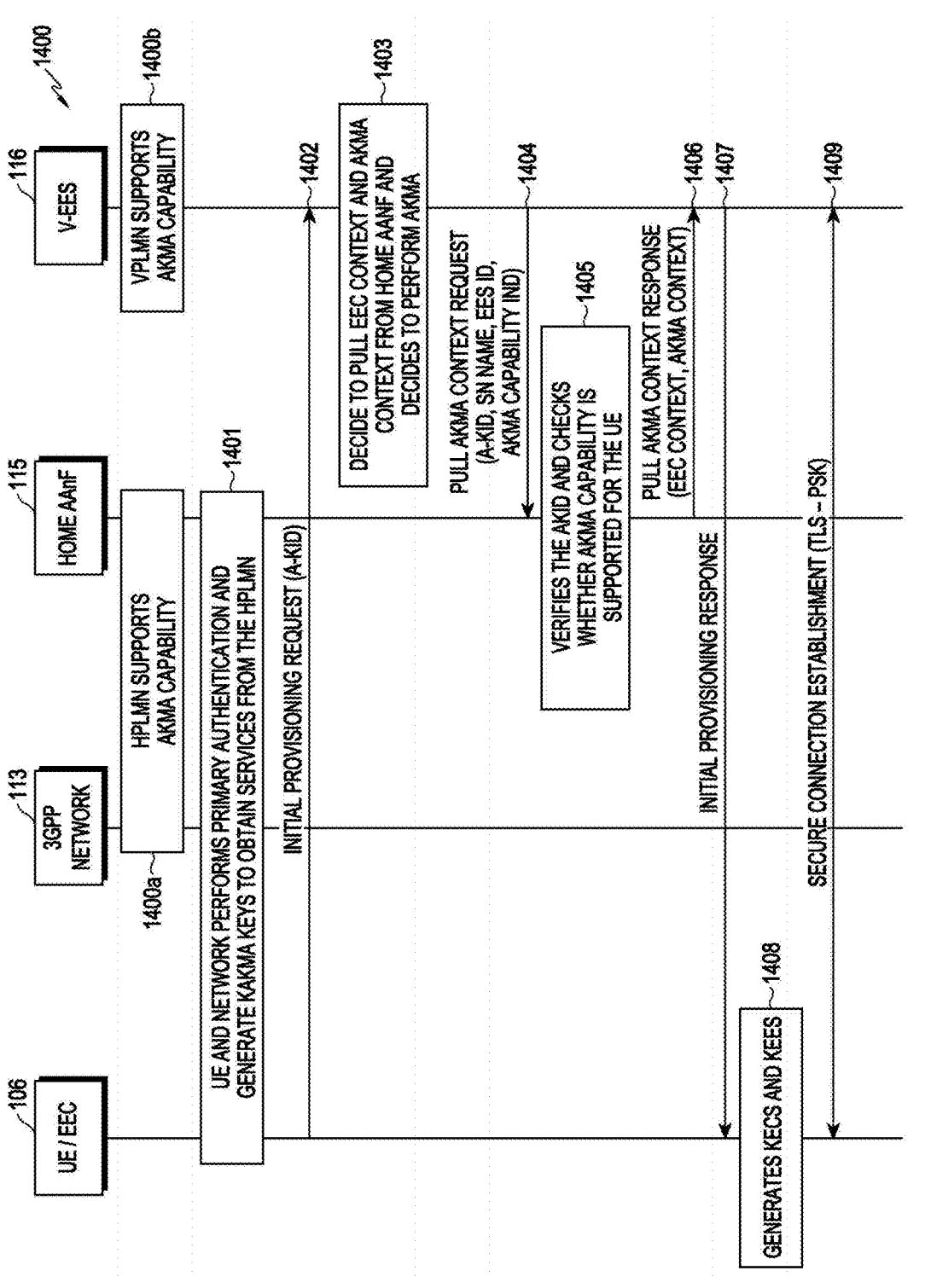
FIG. 14 is a sequential diagram illustrating a method of AKMA optimization in home network and serving network roaming scenario using a pull mechanism in which a Visited Public Land Mobile Network (VPLMN) supports the AKMA, according to an embodiment as disclosed herein.

FIG. 14 is a sequential diagram (1400) illustrating a method of AKMA optimization in home network and serving network roaming scenario using a pull mechanism in which a VPLMN supports AKMA, according to an embodiment as disclosed herein.

In an embodiment, VPLMN Supports only AKMA and Home network supports AKMA.

Pre-condition: UE (106) supports both AKMA and GBA capability, serving network supports only AKMA capability and home network supports AKMA capability.

Further some other pre-conditions: The V-EES has provided the EEC with an EEC Context ID, the H-EES has received the EEC Context ID, source EES (108) Endpoint.

At step 1400a-1400b: The home and servingnetwork supports only AKMA capability.

At step 1401: UE (106) and the network performs the primary authentication and derives AKMA specific keys as defined in TS 33.535.

It is assumed that the UE (106) is already authenticated in home network using AKMA and the TLS session is established and secured tunnel is crested between UE (106) and the ECS (109) and/or EES (108) in the home network.

In an embodiment, AKMA specific keys includes AKMA anchor key (KAKMA) and AKMA Application Keys (KAF/KECS/KEES).

In an embodiment the UE (106) moved to serving network and is trying to establish a connection with the serving network EES (108).

At step 1402: The UE (106) initiates the initial provisioning procedure with the EES (108) in the serving network (V-EES). In the initial provisioning request message, The UE (106) includes A-KID. EES (108) is Application Function (AF) for the AAnF as specified in TS 33.535.

At step 1403: V-EES decides to pull the EEC context, AKMA context from the home PLMN.

At step 1404: Based on information contained in A-KID (Routing ID, Home Network Information), and other local information, V-EES (108) discovers the home AAnF. The V-EES sends Pull AKAM context request to the home AAnF. The request message includes the A-KID, EES (108) ID, AKMA capability indication, SN Name and other possible parameters.

In an embodiment the using the Routing ID received in A-KID is used to identify the AAnF in the home network. In an embodiment, the V-EES contacts the home AAnF via the V-AANF.

At step 1405-1406: up on receiving the request from V-EES, the home AAnF checks whether the KEES key is available. If available, the home AANF provides the AKMA context to the V-EES in the AKMA context response message. The AKMA context includes KAKMA, A-KID and SUPI of the UE (106).

In another embodiment along with the AKMA context, the home AAnF also provides the EEC context to the V-EES. The EEC context information is about the EEC hosting UE (106) and the ACs to which the EEC provides services.

EEC Context relocation procedures allow the EEC Context information to be shared between EESs (via EDGE-9 interactions) as defined in clause 8.9 of TS 23.558.

In an embodiment, the target EES (108) is the HPLMN EES (108) (H-EES) and the source EES (108) is the VPLMN EES (108) (V-EES). The EEC Context provided to a target EES (108) in an EEC Context Pull relocation or an EEC context Push relocation needs to be stored and maintained at the target EES (108).

At step 1407-1408: The V-EES sends the initial provisioning response to the UE (106). The response message includes the AKMA capability of serving network and other possible parameters.

Up on receiving the response message from the V-EES, the UE (106) derives the AKMA specific Application key (KEES) at the UE (106) side.

At step 1409: UE (106) and ECS (109) establishes the TLS tunnel. Once TLS session is created successfully, the EEC initiates the service provisioning procedure with the ECS (109) (as specified in clause 8.3 in TS 23.558) over the established TLS.

Figure 15:
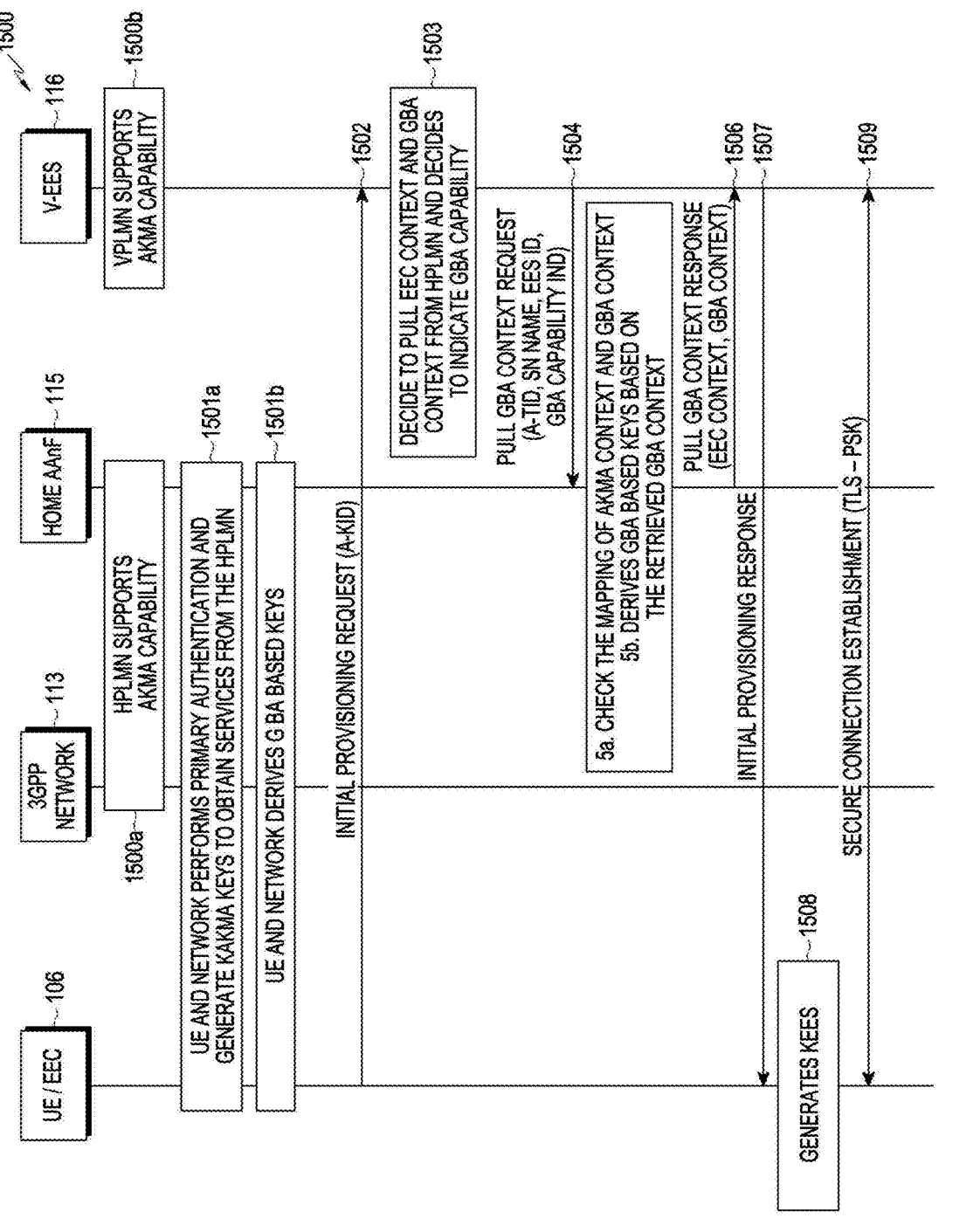
FIG. 15 is a sequential diagram illustrating a method of a Generic Bootstrapping Architecture (GBA) optimization in roaming scenario using a pull mechanism in which the VPLMN supports only GBA, according to an embodiment as disclosed herein.

FIG. 15 is a sequential diagram (1500) illustrating a method of GBA optimization in roaming scenario using a pull mechanism in which the VPLMN supports only GBA, according to an embodiment as disclosed herein.

When operating in multiple Authentication mode, the UE (106) independently maintains and use two different security contexts, an AKMA based security context to interact with the Network supports AKMA capability and a GBA based security context to interact with the Network supports GBA capability.

Pre-condition: UE (106) supports both AKMA and GBA capability, Serving Network supports only GBA capability, Home Network Supports both AKMA and GBA capability Pre-conditions: The V-EES has provided the EEC with an EEC Context ID; and the H-EES has received the EEC Context ID, source EES Endpoint.

At step 1500a-1500b: The home supports both AKMA and GBA capability the home network and servingnetwork supports only GBA capability.

At step 1501*a*: UE (106) and the network perform the primary authentication and derive AKMA specific keys as defined in TS 33.535.

It is assumed that the UE (106) is already authenticated in home network using AKMA and the TLS session is established and secured tunnel is crested between UE (106) and the ECS (109) and/or EES (108) in the home network. In an embodiment, AKMA specific keys includes AKMA anchor key (KAKMA) and AKMA Application Keys (KAF/KECS/KEES).

In another embodiment, at step 1501*b* it is assumed that the UE (106) is already authenticated in home network using GBA and the TLS session is established and secured tunnel is created between UE (106) and the ECS (109) and/or EES (108) in the home network.

In another embodiment, the GBA specific keys includes the Ks and Ks_(ext/int)_NAF keys. The GBA keys are derived as described in TS 33.220.

In an embodiment the UE (106) moved to serving network and is trying to establish a connection with the serving network EES (108).

At step 1502: The UE (106) initiates the initial provisioning procedure with the EES (108) in the serving network (V-EES). In the initial provisioning request message, The UE (106) includes A-KID. EES (108) is Application Function (AF) for the AAnF as specified in TS 33.535.

In an embodiment, the UE (106) does not have any prior info about the GBA capability in the serving network.

At step 1503: Upon receiving the initial provisioning request from the UE (106), the V-EES analyses that the UE is roaming. The V-EES decides to get the EEC context and GBA capability from the home network AAnF as the serving network support only GBA capability.

In an embodiment, the V-EES contacts the home AAnF via the V-AANF.

At step 1504: Based on information contained in A-KID (Routing ID, Home Network Information), and other local information, V-EES discovers the home AAnF. The V-EES sends Pull GBA context request to the home AAnF. The request message includes the A-KID, EES (108) ID, GBA capability indication, SN Name and other possible parameters.

In an embodiment the using the Routing ID received in A-KID is used to identify the AAnF in the home network.

At step 1505-1506: up on receiving the request from V-EES, the home AAnF checks whether network home supports GBA capability. If supported, the home AANF provides the GBA context to the V-EES in the GBA context response message. The GBA context includes KS, B-TID and SUPI of the UE (106))

In an embodiment, the home AAnF maintains the mapping of AKMA and GBA context.

In another embodiment, the AAnF contacts the UDM and retrieves the GBA context for the request received by providing the SUPI.

In another embodiment along with the GBA context, the home AAnF also provides the EEC context to the V-EES. The EEC context information is about the EEC hosting UE and the ACs to which the EEC provides services.

EEC Context relocation procedures allow the EEC Context information to be shared between EESs (via EDGE-9 interactions) as defined in clause 8.9 of TS 23.558.

In an embodiment, the target EES (108) is the HPLMN EES (108) (H-EES) and the source EES (108) is the VPLMN EES (108) (V-EES). The EEC Context provided to a target EES (108) in an EEC Context Pull relocation or an EEC context Push relocation needs to be stored and maintained at the target EES (108).

At step 1507-1508: Upon receiving the GBA context, the V-EES (108) The V-EES sends the initial provisioning response to the UE (106). The response message includes the GBA capability of serving network and other possible parameters.

Up on receiving the response message from the V-EES, the UE (106) derives the GBA specific Application key (KEES) at the UE (106) side.

At step 1509: UE (106) and ECS (109) establishes the TLS tunnel. Once TLS session is created successfully, the EEC initiates the service provisioning procedure with the ECS (109) (as specified in clause 8.3 in TS 23.558) over the established TLS.

Figure 16:
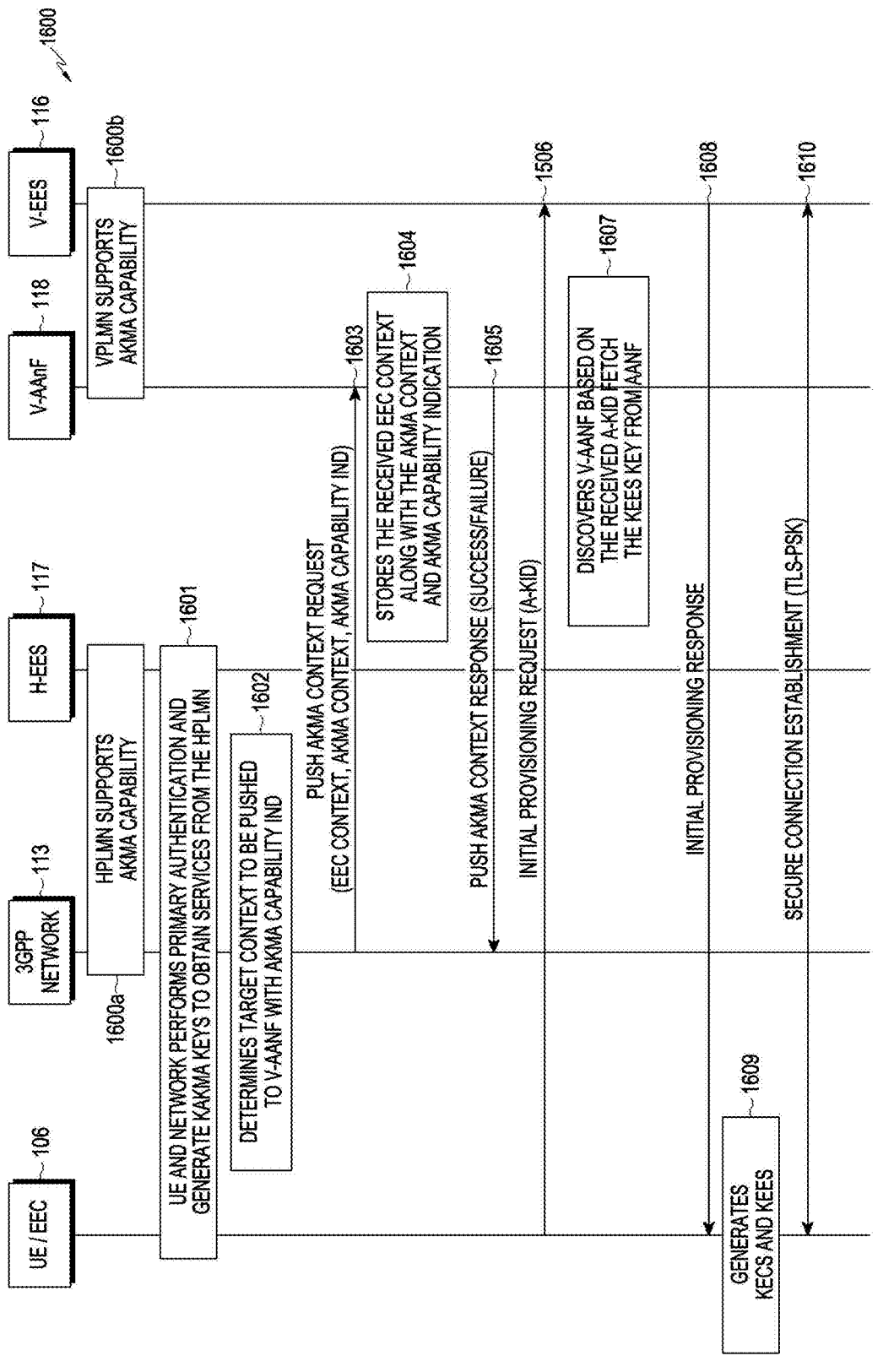
FIG. 16 is a sequential diagram illustrating a method of AKMA optimization using the push mechanism at the VPLMN, according to an embodiment as disclosed here.

FIG. 16 is a sequential diagram (1600) illustrating a method of AKMA optimization using the push mechanism at the VPLMN, according to an embodiment as disclosed herein.

Pre-condition: UE (106) supports both AKMA and GBA capability; Serving Network supports only AKMA capability; Home Network Supports AKMA capability.

Pre-conditions: The V-EES has provided the EEC with an EEC Context ID; and the H-EES has received the EEC Context ID, source EES (108) Endpoint.

At step 1600*a*-1600*b*: The home and serving network supports only AKMA capability.

At step 1601: UE (106) and the network performs the primary authentication and derives AKMA specific keys as defined in TS 33.535.

It is assumed that the UE (106) is already authenticated in home network using AKMA and the TLS session is established and secured tunnel is crested between UE (106) and the ECS (109) and/or EES (108) in the home network.

In an embodiment, AKMA specific keys includes AKMA anchor key (KAKMA) and AKMA Application Keys (KAF/KECS/KEES).

In an embodiment the UE (106) moved to serving network and is trying to establish a connection with the serving network EES (108).

In another embodiment, the cryptographically separate KAKMA keys are derived by including the SN name/SN ID in the KAKMA derivation.

At step 1602: The AAnF detects based on the SN name/SN ID that the UE (106) is roaming and it decides to push the AKMA context and AKMA capability indication to the V-AAnF.

In another embodiment, UDM also provides AUSF with "AKMA Indication', specifying whether the generated AKMA Keys need to be propagated to the serving-PLMN, depending on operator agreements and/or AKMA support in VPLMN.

At step 1603: The Home AAnF sends the Push AKMA context request to the V-AAnF. The push message includes the AKMA context (e.g. KAKMA, A-KID and SUPI of the UE (106)), EEC context, AKMA capability indication.

At step 1604-1605: upon receiving the Push AKMA context request from the Home AAnF, the V-EES stores the received info with AKMA capability and sends an Acknowledgement/response message to the home AAnF including the Success/failure.

At step 1606: The UE (106) initiates the initial provisioning procedure with the EES (108) in the serving network (V-EES). In the initial provisioning request message, The UE (106) includes A-KID. EES (108) is Application Function (AF) for the AAnF as specified in TS 33.535.

At step 1607: Upon receiving the initial provisioning request, the V-EES discovers the V-AAnF. V-AAnF checks the stored AKMA capability support.

Based on the request, the V-AAnF derives the Application key (KEES) using the stored AKMA context In an embodiment, based on the configuration provided by the Serving Network (SN), the UE (106) construct the A-KID using the MNC and MCC of the Home PLMN or the serving PLMN. Then, based on the received A-KID from the UE (106), the AF discovers the AAnF either in the serving network or in the Home Network.

At step 1608-1609: The V-EES sends the initial provisioning response to the UE (106). The response message includes the AKMA capability of serving network and other possible parameters.

Up on receiving the response message from the V-EES, the UE (106) derives the AKMA specific Application key (KEES) at the UE (106) side.

At step 1610: UE (106) and ECS (109) establish the TLS tunnel. Once TLS session is created successfully, the EEC initiates the service provisioning procedure with the ECS (109) (as specified in clause 8.3 in TS 23.558) over the established TLS.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a user equipment (UE) in an edge network system, the method comprising:

receiving, from a core network to an edge enabler client (EEC) of the UE, a message including edge configuration server (ECS) configuration information, wherein the ECS configuration information includes an ECS address, an ECS provider identifier, and at least one authentication method which is selected by a home network (HN) and a serving network (SN);

if more than one authentication method is supported, selecting an authentication method of the at least one authentication method based on the ECS configuration information; and if the at least one authentication method is not supported, selecting a default authentication method based on the ECS configuration information.

2. The method of claim 1, wherein the at least one authentication method is selected based on a local policy, and wherein the default authentication method is selected based on an operator policy.

3. A method performed by an edge configuration server (ECS) in an edge network system, the method comprising:

receiving, from an edge enabling server (EES), an EES registration request for registering the EES, wherein the EES registration request includes first authentication methods supported by the EES;

receiving, from a core network, information on second authentication methods supported by a home network and a serving network;

selecting at least one authentication method supported by the home network, the serving network, and the EES based on the first authentication methods and the second authentication methods; and transmitting, to the EES, an EES registration response in response to the EES registration request.

4. The method of claim 3, wherein the transmitting, to the EES, an EES registration response in response to the EES registration request comprises:

generating configuration information including at least one of an ECS address, an ECS provider identifier, the at least one authentication method supported by at least one of the ECS, the EES, the home network, and the serving network; and transmitting, to the EES, the configuration information for selecting the at least one authentication method.

5. The method of claim 3, wherein the selecting the at least one authentication method supported by the home network, the serving network, and the EES comprises:

validating an EES security credential, wherein the EES registration request includes the at least one authentication method supported by the EES, an EES profile, the EES security credential;

storing registration information in the EES registration request in case that the EES security credential is successfully validated;

indicating a status of validation of the EES registration request to the EES;

identifying whether the at least one of authentication method that is supported by the home network, the serving network, the ECS, and the EES is in common; and selecting the at least one authentication method in case that the at least one authentication method that is supported by the home network, the serving network, the ECS, and the EES in common is identified.

6. A User Equipment (UE) in an edge network system, wherein the UE comprises:

a transceiver; and a processor coupled to the transceiver, wherein the processor is configured to:

receive, from a core network to an edge enabler client (EEC) of the UE, a message including edge configuration server (ECS) configuration information, wherein the ECS configuration information includes an ECS address, an ECS provider identifier, and at least one authentication method which is selected by a home network (HN) and a serving network (SN);

if more than one authentication method is supported, select an authentication method of the at least one authentication method based on the ECS configuration information; and if the at least one authentication method is not supported, select a default authentication method based on the ECS configuration information.

7. The UE of claim 6, wherein the at least one authentication method is selected based on a local policy, and wherein the default authentication method is selected based on an operator policy.

8. An edge configuration server (ECS) in an edge network system, wherein the ECS comprises:

a transceiver; and a processor coupled to the transceiver, wherein the processor is configured to:

receive, from an edge enabling server (EES), an EES registration request for registering the EES, wherein the EES registration request includes first authentication methods supported by the EES;

receive, from a core network, information on second authentication methods supported by a home network and a serving network;

select at least one authentication method supported by the home network, the serving network, and the EES based on the first authentication methods and the second authentication methods; and transmit, to the EES, an EES registration response in response to the EES registration request.

9. The ECS of claim 8, wherein the processor is further configured to:

generate configuration information including at least one of an ECS address, an ECS provider identifier, the at least one authentication method supported by at least one of the ECS, the EES, the home network, and the serving network, and transmit, to the EES, the configuration information for selecting the at least one authentication method.

10. The ECS of claim 8, wherein the processor is further configured to:

validate an EES security credential, wherein the EES registration request includes the at least one authentication method supported by the EES, an EES profile, and the EES security credential, store registration information in the EES registration request in case that the EES security credential is successfully validated, indicate a status of validation of the EES registration request to the EES, identify whether the at least one authentication method that is supported by the home network, the serving network, the ECS, and the EES is in common, and select the at least one authentication method in case that the at least one authentication method that is supported by the home network, the serving network, the ECS, and the EES in common is identified.

* * * * *